United States Patent
Abu-Surra et al.

(10) Patent No.: US 11,451,270 B2
(45) Date of Patent: Sep. 20, 2022

(54) METHOD AND APPARATUS FOR END-TO-END GIGAHERTZ BEAMFORMING SYSTEM

(71) Applicant: Samsung Electronics Co., Ltd., Suwon-si (KR)

(72) Inventors: Shadi Abu-Surra, Plano, TX (US); Won Suk Choi, McKinney, TX (US); Gang Xu, Allen, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/368,693

(22) Filed: Jul. 6, 2021

(65) Prior Publication Data

US 2022/0038142 A1 Feb. 3, 2022

Related U.S. Application Data

(60) Provisional application No. 63/058,423, filed on Jul. 29, 2020, provisional application No. 63/148,914, filed on Feb. 12, 2021.

(51) Int. Cl.
  *H04B 7/0413* (2017.01)
  *H01Q 3/38* (2006.01)
  *H04L 27/01* (2006.01)

(52) U.S. Cl.
  CPC ............ *H04B 7/0413* (2013.01); *H01Q 3/38* (2013.01); *H04L 27/01* (2013.01)

(58) Field of Classification Search
  CPC ........ H01Q 21/065; H01Q 1/38; H01Q 21/24; H01Q 25/001; H01Q 3/28; H01Q 21/0025; H04B 7/0413; H04L 27/01
  See application file for complete search history.

(56) References Cited

U.S. PATENT DOCUMENTS

| | | |
|---|---|---|
| 5,870,063 A | 2/1999 | Cherrette et al. |
| 9,949,259 B2 | 4/2018 | Eitan |

(Continued)

FOREIGN PATENT DOCUMENTS

| | | |
|---|---|---|
| CN | 111969307 A | 11/2020 |
| EP | 3910814 A1 | 11/2021 |

OTHER PUBLICATIONS

International Search Report dated Nov. 1, 2021 in connection with International Patent Application No. PCT/KR2021/009789, 3 pages.

(Continued)

*Primary Examiner* — Rahel Guarino

(57) ABSTRACT

An end-to-end digital beamforming system includes a transmitter configured to transmit data and a receive configured to receive the data. Each of the transmitter and receiver includes a transceiver configured to communicate via a wired or wireless communication medium. Each of the transmitter and receiver also includes a processor and a base-tile antenna array comprising a plurality of antenna tiles. Each of the antenna tiles includes a radio frequency integrated circuit (RFIC) and an antenna-array-in-package comprising a plurality of antenna elements. The antenna tiles are disposed a different rotations such that a first antenna tile is disposed to transmit a first signal at a first polarization and a second antenna tile is disposed to transmit a second signal at a second polarization. Additionally, each of the antenna tiles transmits a part of a bandwidth.

20 Claims, 14 Drawing Sheets

(56) References Cited

U.S. PATENT DOCUMENTS

| | | | |
|---|---|---|---|
| 10,924,218 B2 | 2/2021 | Lomayev et al. | |
| 10,931,417 B2 | 2/2021 | Lomayev et al. | |
| 10,951,295 B2 | 3/2021 | Paramesh et al. | |
| 2011/0109507 A1* | 5/2011 | Warnick | H01Q 21/0025 342/368 |
| 2013/0016709 A1 | 1/2013 | Trachewsky | |
| 2013/0194134 A1 | 8/2013 | Beeker et al. | |
| 2017/0331176 A1 | 11/2017 | Levy et al. | |
| 2021/0057817 A1 | 2/2021 | Lenive | |
| 2021/0359739 A1 | 11/2021 | Mattheijssen et al. | |

OTHER PUBLICATIONS

Written Opinion of the International Searching Authority dated Nov. 1, 2021 in connection with International Patent Application No. PCT/KR2021/009789, 4 pages.

"3rd Generation Partnership Project; Technical Specification Group Radio Access Network; Study on requirements for NR beyond 52.6 GHz (Release 16)", 3GPP TR 38.807 V0.1.0, Mar. 2019, 43 pages.

Federal Communications Commission, In the Matter of Spectrum Horizons James Edwin Whedbee Petition for Rulemaking to Allow Unlicensed Operation in the 95-1,000 GHz Band, Mar. 2019, 45 pages, FC 19-19, Federal Communications Commission, Washington, D.C. 20554.

Federal Communications Commission,"FCC Takes Steps To Open Spectrum Horizons for New Services and Technologies", FCC News from the Federal Communications Commission, Mar. 15, 2019, 1 page; RM-11795, Federal Communications Commission, Washington.

Sengupta, Kaushik, et al. , "Terahertz integrated electronic and hybrid electronic-photonic systems", Nature Electronics, Dec. 2018, 14 pages, vol. 1, No. 12, www.nature.com/natureelectronics.

Simsek, Arda, et al., "A 140 GHz MIMO Transceiver in 45 nm SOI CMOS", 2018 IEEE BiCMOS and Compound Semiconductor Integrated Circuits and Technology Symposium (BCICTS), 2018, 4 pages, San Diego, CA.

Simsek, Arda, et al., "A 140GHz Two-Channel CMOS Transmitter using Low-Cost Packaging Technologies", IEEE Wireless Communications and Networking Conference, May 2020, 3 pages.

Pollard, Roger D., "Guest Editorial", IEEE Transactions on Microwave Theory and Techniques, Apr. 2000, 1 page, vol. 48, No. 4.

Samsung Research, "6G The Next Hyper—Connected Experience for All." Samsung 6G Vision, 46 pages.

"Information technology—Telecommunications and information exchange between systems—Local and metropolitan area networks—Specific requirements —", Cooperative agreement between ISO/IEC JTC 1 SC 6 and the IEEE 802 LMSC, 2007, 16 pages, Forth Edition.

Tian, Shuang, et al., "Fractionally Spaced Equalizer for Next Generation Terahertz Wireless Communication Systems", SAMSUNG Best Paper Award 2020, Jul. 30, 2020, 9 pages.

Ye, Qiaoyang, et al., "Fractionally Spaced Equalizer for Next Generation Terahertz Wireless Communication Systems", IEEE, Jun. 14, 2021, 7 pages.

\* cited by examiner

METHOD AND APPARATUS FOR END-TO-END GIGAHERTZ BEAMFORMING SYSTEM

CROSS-REFERENCE TO RELATED APPLICATIONS AND CLAIM OF PRIORITY

The present application claims priority to U.S. Provisional Patent Application No. 63/058,423, filed on Jul. 29, 2020 and U.S. Provisional Patent Application No. 63/148,914, filed on Feb. 12, 2021. The contents of the above-identified patent documents are incorporated herein by reference.

TECHNICAL FIELD

The present disclosure relates generally to wireless communication systems and, more specifically, the present disclosure relates to an end-to-end 140 gigahertz (GHz) fully digital beamforming system.

BACKGROUND

5th generation (5G) or new radio (NR) mobile communications is recently gathering increased momentum with all the worldwide technical activities on the various candidate technologies from industry and academia. The candidate enablers for the 5G/NR mobile communications include massive antenna technologies, from legacy cellular frequency bands up to high frequencies, to provide beamforming gain and support increased capacity, new waveform (e.g., a new radio access technology (RAT)) to flexibly accommodate various services/applications with different requirements, new multiple access schemes to support massive connections, and so on.

In March 2019, the Federal Communications Commission (FCC) opened the spectrum between 95 GHz and 3,000 GHz for experimental use and unlicensed applications, to encourage the development of new wireless communication technologies. Additionally, discussions on use cases and deployment scenarios for 5G NR systems operating beyond 52.6 GHz bands also have begun. Support for operation in these bandwidths will be included in 3GPP Release 16. It is inevitable that telecommunications will utilize the terahertz (THz) bands for future wireless systems. The THz band is typically defined as the bandwidth ranging from 0.1 THz to 10 THz. A total of 102 GHz spectrum in the range between 95 GHz and 300 GHz is also being made accessible for licensed fixed point-to-point and mobile services through the Spectrum Horizon program. Accordingly, the extremely wideband THz channels with tens of GHz-wide bandwidth could potentially support the Terabits per second (Tbps) communication as required by the future 6G standards.

To realize stable THz communications in practice is not straight forward, and a handful of fundamental and technical challenges need to be overcome. Commonly, this band is often referred to as the terahertz gap, that is mainly due to the lack of efficient devices, which generate and detect signals in these frequencies. In this band the device dimensions are significant relative to the signal wavelength, and this results in high losses by dielectric loss and skin-depth, surface roughness losses. Also devices show low efficiency by significant impact of parasitics of the device. The severe path-loss and atmospheric absorption add to the challenge of utilizing this band.

SUMMARY

The present disclosure relates to wireless communication systems and, more specifically, the present disclosure relates to an end-to-end 140 gigahertz (GHz) fully digital beamforming system.

In one embodiment, an apparatus is provided. The apparatus includes a transceiver configured to communicate via a wired or wireless communication medium. The apparatus also includes a processor and a base-tile antenna array comprising a plurality of antenna tiles. Each of the antenna tiles includes a radio frequency integrated circuit (RFIC) and an antenna-array-in-package comprising a plurality of antenna elements. The antenna tiles are disposed at different rotations such that a first antenna tile is disposed to transmit a first signal at a first polarization and a second antenna tile is disposed to transmit a second signal at a second polarization. Additionally, each of the antenna tiles transmits a part of a bandwidth.

In another embodiment, a method is provided. The method includes transmitting, by a transceiver via a base-tile antenna array comprising a plurality of antenna tiles, a data file over a number of channels, by: partitioning the data file into a number of data file segments; and transmitting each of the data file segments via different rotations such that a first signal is transmitted via a first antenna tile at a first polarization and a second signal is transmitted via a second antenna tile at a second polarization. Each of the antenna tiles transmits a part of a bandwidth. Each of the antenna tiles includes a radio frequency integrated circuit (RFIC) and an antenna-array-in-package comprising a plurality of antenna elements.

In yet another embodiment, a non-transitory computer readable medium is provided. The non-transitory computer readable medium a plurality of instructions that, when executed by at least one processor, cause the at least one processor to transmit, via a transceiver coupled to a base-tile antenna array comprising a plurality of antenna tiles, a data file over a number of channels, by partitioning the data file into a number of data file segments; and transmitting each of the data file segments via a different rotations such that a first signal is transmitted via a first antenna tile at a first polarization and a second signal is transmitted via a second antenna tile at a second polarization. Each of the antenna tiles transmits a part of a bandwidth. Each of the antenna tiles includes a radio frequency integrated circuit (RFIC) and an antenna-array-in-package comprising a plurality of antenna elements.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system, or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
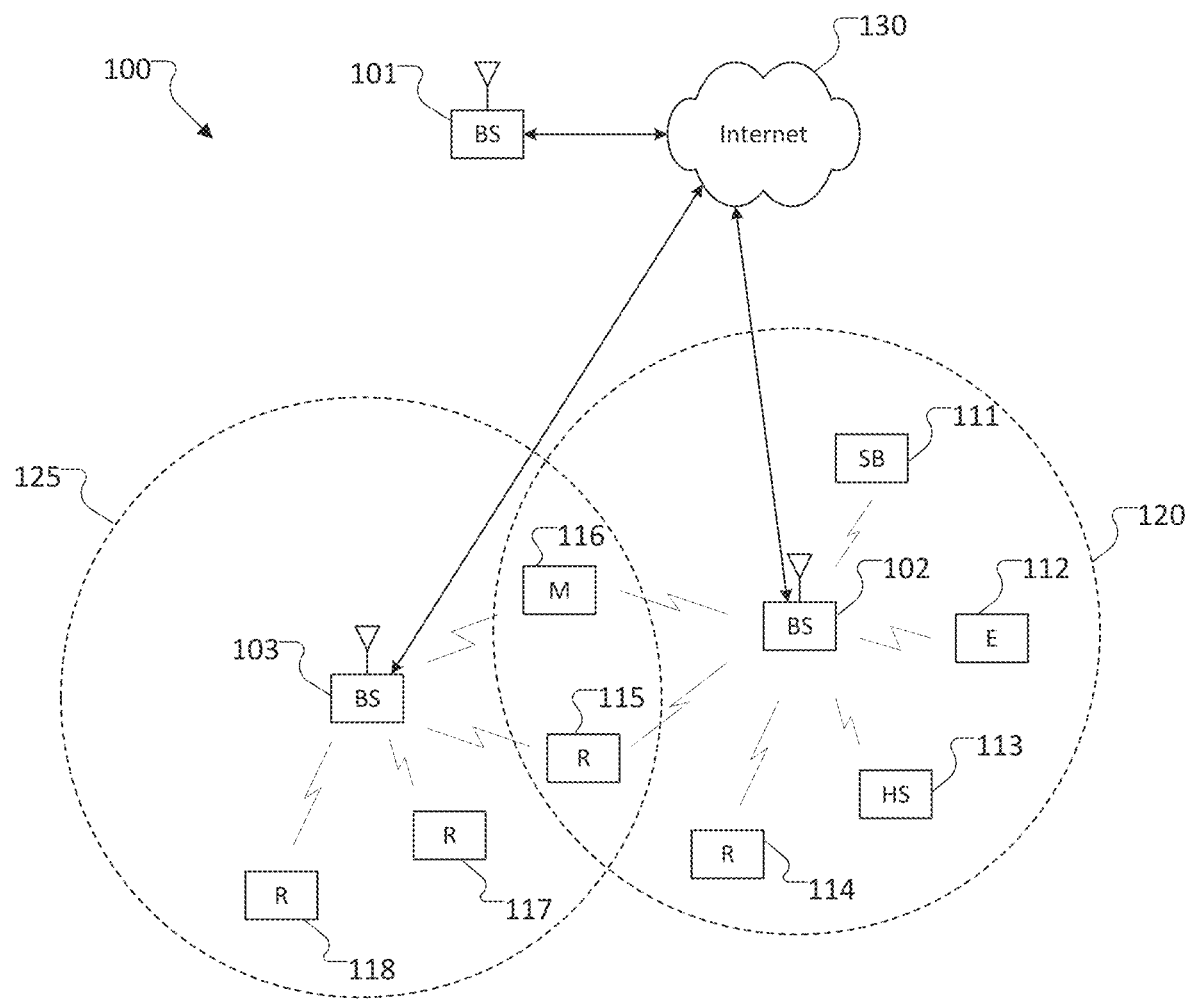
FIG. 1 illustrates an example wireless network according to embodiments of the present disclosure.

FIG. 1 through FIG. 19, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

It is projected that mobile traffic will increase by 80× by year 2030. To meet this increase in demand, it is inevitable to utilize the terahertz bands (0.1 THz to 10 THz) for future 6G wireless systems. However, operating at such high frequency comes with several fundamental and technical challenges.

The THz communications may play an essential role in enabling terabit-fast speed (i.e., terabit-per-second throughput) in future 6G system. One may argue why do we need terabit-fast speed to our devices in the future. The simple answer: there is no limit to human creativity, if we provide such a speed, the innovators will utilize it in extremely creative ways beyond today's imaginations. Nevertheless, there are many trends that indicates an increase on the demand for throughput in the near future. Of these trends, the fast growth in artificial intelligence (AI), robotics, and automation. In this vision, machines will be the dominant consumers of the communication networks. Having terabit-fast links will enable the sheer number of machines to mesh network without bottlenecks. Moreover, of these machines might take the form of a truly immersive extended reality (XR), high-fidelity mobile hologram, or digital replica [5]. These high-end machines will require communication links with terabit-fast speeds.

As noted above, to realize stable THz communications in practice is not straight forward, and a handful of fundamental and technical challenges need to be overcome. Commonly, this band is often referred to as the terahertz gap, that is mainly due to the lack of efficient devices, which generate and detect signals in these frequencies. In this band the device dimensions are significant relative to the signal wavelength, and this results in high losses by dielectric loss and skin-depth, surface roughness losses. Also devices show low efficiency by significant impact of parasitics of the device. The severe path-loss and atmospheric absorption add to the challenge of utilizing this band. On the positive side, in the past 10 years a lot of research and development have been done on: 1) designing RF circuits operating at the lower THz band, and 2) utilizing large antenna arrays to mitigate path-loss. Scaling up this technology to extremely large phased arrays will be essential to realize a reliable THz link.

Embodiments of the present discloser provide an antenna system and transceiver architecture that provide an end-to-end 140 gigahertz (GHz) fully digital beamformed system. Certain embodiments of the present disclosure provide a 144 GHz wireless link prototype capable of operating in lower THz bands for wireless communications. Embodiments of the present disclosure also provide a real-time link with adaptive beam steering, which further provide data-rate of 6.3 Gbps at 15-meter distance in a 2 GHz of bandwidth. Certain embodiments of the present disclosure provide an end-to-end system with 16-channels digitally-beamformed 140 GHz system with dynamic beam steering capability. Certain embodiments of the present disclosure provide a beamformed link between transmitter and receiver. It is noted that although various embodiments are described with using a 140 GHz, this is an example and embodiments of the present disclosure can be implemented in any other frequency.

The following documents are hereby incorporated by reference into the present disclosure as if fully set forth herein: 3GPP TR 38.807-010, "Study on NR beyond 52.6 GHz," March 2019; Roger D. Pollard, "Guest Editorial," IEEE Transactions on Microwave Theory and Techniques, vol. 48, no. 4, pp. 625-625, April 2000; FCC 19-19 First Report and Order, "Spectrum horizons," March 2019; Samsung white-paper, "Samsung 6G vision," July 2020, https://cdn.codeground.org/nsr/downloads/researchareas/6G%20Vision.pdf; Kaushik Sengupta et al., "Terahertz integrated electronic and hybrid electronic-photonic systems" Nature Electron, vol. 1, no. 12, pp. 622-635, December 2018; Arda Simsek, Ahmed S. H. Ahmed, Ali A. Farid, Utku Soylu and Mark J. W. Rodwell, "A 140 GHz Two-Channel CMOS Transmitter using Low-Cost Packaging Technologies", IEEE Wireless Communications and Networking Conference, May 2020; A. Simsek, S. Kim and M. J. W. Rodwell, "A 140 GHz MIMO Transceiver in 45 nm SOI CMOS," 2018 IEEE BiCMOS and Compound Semiconductor Integrated Circuits and Technology Symposium (BCICTS), San Diego, Calif., 2018, pp. 231-234; IEEE draft standard for information technology—telecommunications and information exchange between systems local and metropolitan area networks—specific requirements part 11: Wireless LAN Medium Access Control (MAC) and Physical Layer (PHY) Specifications, IEEE P802.11ay/D5.0, October 2019; and Qiaoyang Ye, Joonyoung Cho, Jeongho Jeon, Shadi Abu-Surra, Kitaek Bae, and Jianzhong Zhang, "Fractionally Spaced Equalizer Design for Terahertz Wireless Communication Systems" Submitted to IEEE ICC 2021 Workshop—TeraCom.

Figure 2:
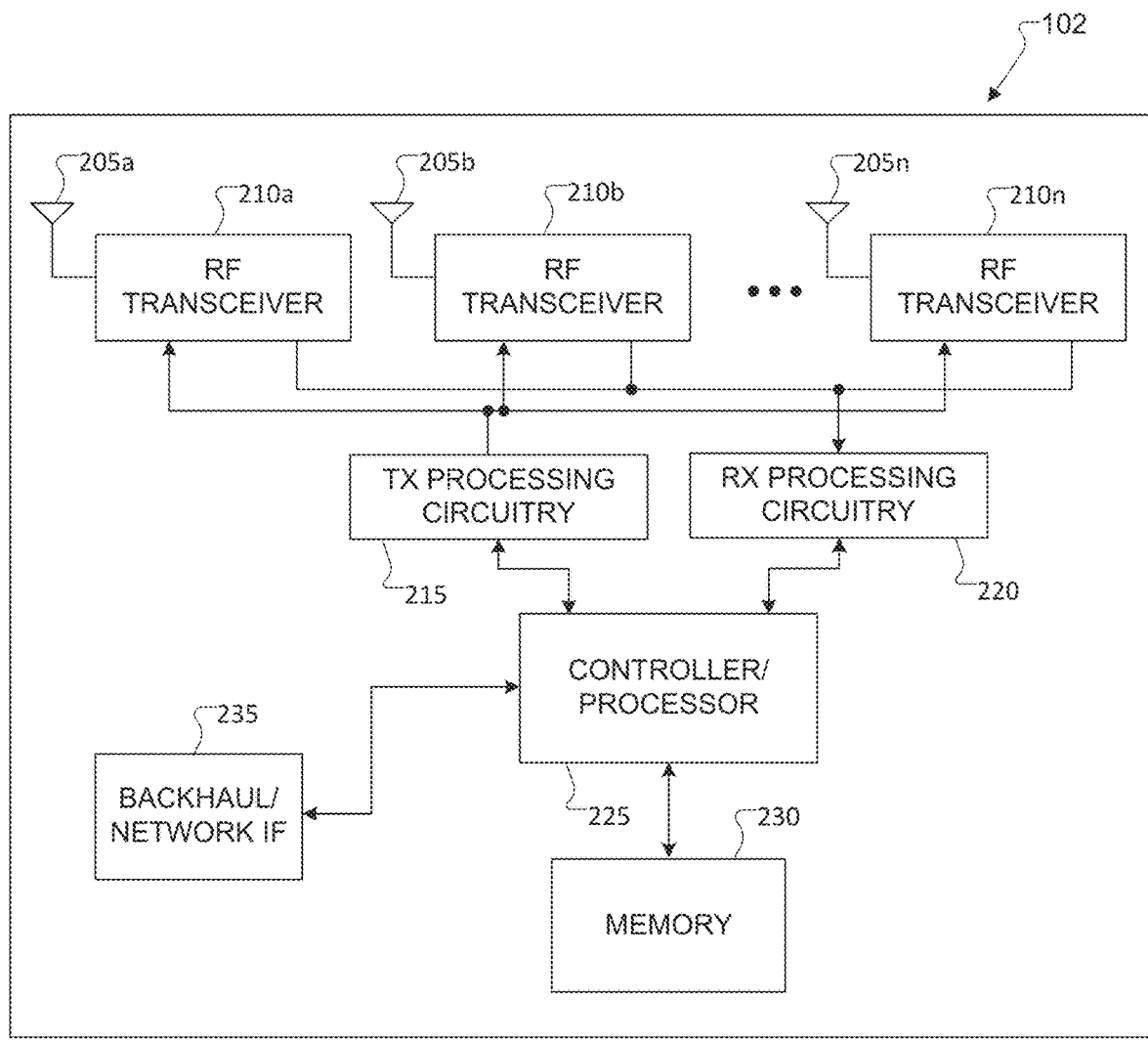
FIG. 2 illustrates an example gNB according to embodiments of the present disclosure.
Figure 3:
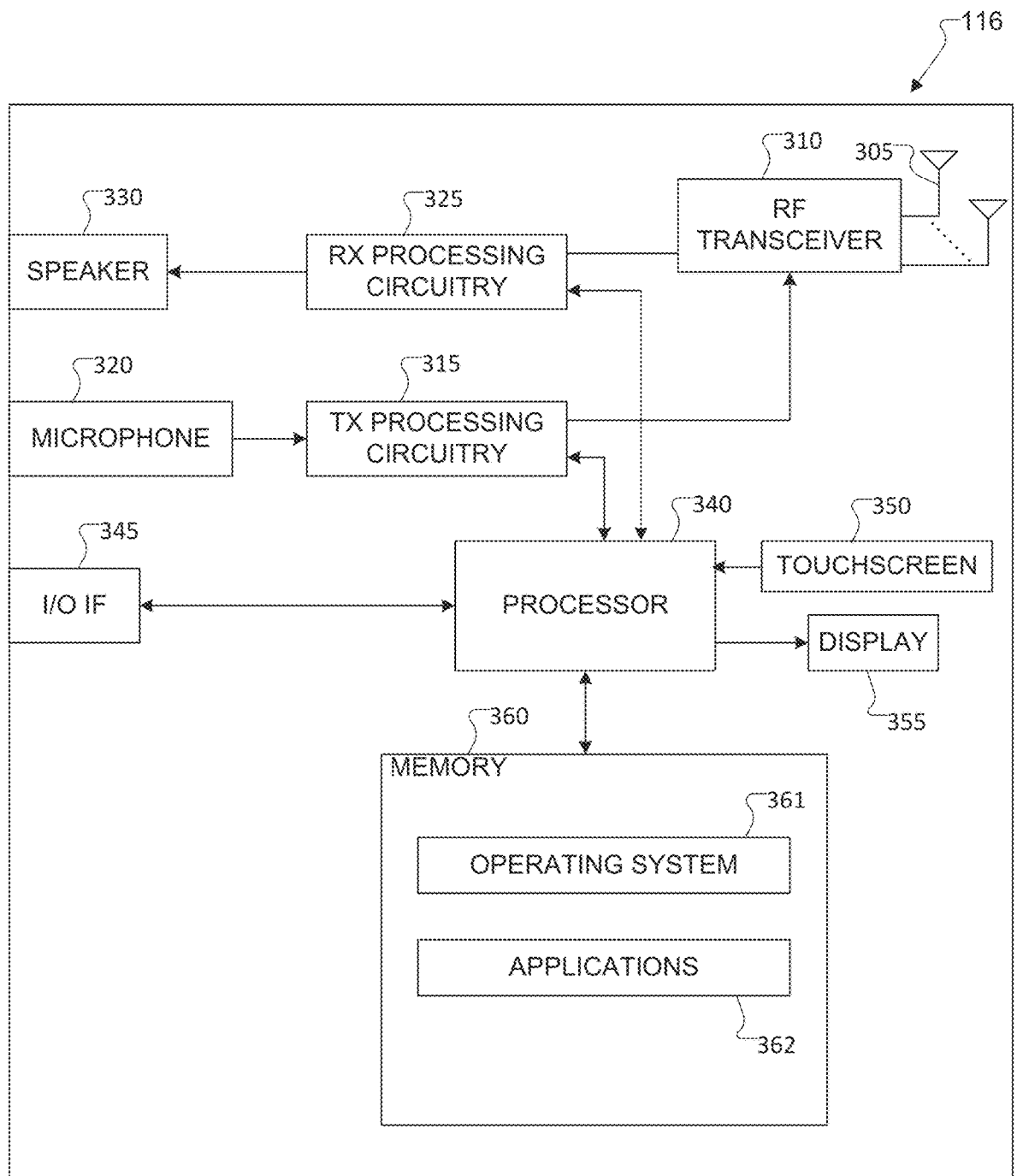
FIG. 3 illustrates an example UE according to embodiments of the present disclosure.

FIGS. 1-3 below describe various embodiments implemented in wireless communications systems and with the use of orthogonal frequency division multiplexing (OFDM) or orthogonal frequency division multiple access (OFDMA) communication techniques. The descriptions of FIGS. 1-3 are not meant to imply physical or architectural limitations to the manner in which different embodiments may be implemented. Different embodiments of the present disclosure may be implemented in any suitably-arranged communications system.

FIG. 1 illustrates an example wireless network according to embodiments of the present disclosure. The embodiment of the wireless network shown in FIG. 1 is for illustration only. Other embodiments of the wireless network 100 could be used without departing from the scope of this disclosure.

As shown in FIG. 1, the wireless network includes a gNB 101 (e.g., base station, BS), a gNB 102, and a gNB 103. The gNB 101 communicates with the gNB 102 and the gNB 103. The gNB 101 also communicates with at least one network 130, such as the Internet, a proprietary Internet Protocol (IP) network, or other data network.

The gNB 102 provides wireless broadband access to the network 130 for a first plurality of user equipments (UEs) within a coverage area 120 of the gNB 102. The first plurality of UEs includes a UE 111, which may be located in a small business; a UE 112, which may be located in an enterprise (E); a UE 113, which may be located in a WiFi hotspot (HS); a UE 114, which may be located in a first residence (R); a UE 115, which may be located in a second residence (R); and a UE 116, which may be a mobile device (M), such as a cell phone, a wireless laptop, a wireless PDA, or the like. The gNB 103 provides wireless broadband access to the network 130 for a second plurality of UEs within a coverage area 125 of the gNB 103. The second plurality of UEs includes the UE 115 and the UE 116. In some embodiments, one or more of the gNBs 101-103 may communicate with each other and with the UEs 111-116 using 5G/NR, LTE, LTE-A, WiMAX, WiFi, or other wireless communication techniques.

Depending on the network type, the term "base station" or "BS" can refer to any component (or collection of components) configured to provide wireless access to a network, such as transmit point (TP), transmit-receive point (TRP), an enhanced base station (eNodeB or eNB), a 5G/NR base station (gNB), a macrocell, a femtocell, a WiFi access point (AP), or other wirelessly enabled devices. Base stations may provide wireless access in accordance with one or more wireless communication protocols, e.g., 5G/NR 3GPP NR, long term evolution (LTE), LTE advanced (LTE-A), high speed packet access (HSPA), Wi-Fi 802.11a/b/g/n/ac, etc. For the sake of convenience, the terms "BS" and "TRP" are used interchangeably in this patent document to refer to network infrastructure components that provide wireless access to remote terminals. Also, depending on the network type, the term "user equipment" or "UE" can refer to any component such as "mobile station," "subscriber station," "remote terminal," "wireless terminal," "receive point," or "user device." For the sake of convenience, the terms "user equipment" and "UE" are used in this patent document to refer to remote wireless equipment that wirelessly accesses a BS, whether the UE is a mobile device (such as a mobile telephone or smartphone) or is normally considered a stationary device (such as a desktop computer or vending machine).

Dotted lines show the approximate extents of the coverage areas 120 and 125, which are shown as approximately circular for the purposes of illustration and explanation only. It should be clearly understood that the coverage areas associated with gNBs, such as the coverage areas 120 and 125, may have other shapes, including irregular shapes, depending upon the configuration of the gNBs and variations in the radio environment associated with natural and man-made obstructions.

As described in more detail below, one or more of the UEs 111-116 include circuitry, programing, or a combination thereof, for beam management, beamforming, and wireless communications on a 140 GHz link. In certain embodiments, and one or more of the gNBs 101-103 includes circuitry, programing, or a combination thereof for beam management, beamforming, and wireless communications on a 140 GHz link.

Although FIG. 1 illustrates one example of a wireless network, various changes may be made to FIG. 1. For example, the wireless network could include any number of gNBs and any number of UEs in any suitable arrangement. Also, the gNB 101 could communicate directly with any number of UEs and provide those UEs with wireless broadband access to the network 130. Similarly, each gNB 102-103 could communicate directly with the network 130 and provide UEs with direct wireless broadband access to the network 130. Further, the gNBs 101, 102, and/or 103 could provide access to other or additional external networks, such as external telephone networks or other types of data networks.

FIG. 2 illustrates an example gNB 102 according to embodiments of the present disclosure. The embodiment of the gNB 102 illustrated in FIG. 2 is for illustration only, and the gNBs 101 and 103 of FIG. 1 could have the same or similar configuration. However, gNBs come in a wide variety of configurations, and FIG. 2 does not limit the scope of this disclosure to any particular implementation of a gNB.

As shown in FIG. 2, the gNB 102 includes multiple antennas 205a-205n, multiple RF transceivers 210a-210n, transmit (TX) processing circuitry 215, and receive (RX) processing circuitry 220. The gNB 102 also includes a controller/processor 225, a memory 230, and a backhaul or network interface 235.

The RF transceivers 210a-210n receive, from the antennas 205a-205n, incoming RF signals, such as signals transmitted by UEs in the network 100. The RF transceivers 210a-210n down-convert the incoming RF signals to generate IF or baseband signals. The IF or baseband signals are sent to the RX processing circuitry 220, which generates processed baseband signals by filtering, decoding, and/or digitizing the baseband or IF signals. The RX processing circuitry 220 transmits the processed baseband signals to the controller/processor 225 for further processing.

The TX processing circuitry 215 receives analog or digital data (such as voice data, web data, e-mail, or interactive video game data) from the controller/processor 225. The TX processing circuitry 215 encodes, multiplexes, and/or digitizes the outgoing baseband data to generate processed baseband or IF signals. The RF transceivers 210a-210n receive the outgoing processed baseband or IF signals from the TX processing circuitry 215 and up-converts the baseband or IF signals to RF signals that are transmitted via the antennas 205a-205n.

The controller/processor 225 can include one or more processors or other processing devices that control the overall operation of the gNB 102. For example, the controller/processor 225 could control the reception of forward channel signals and the transmission of reverse channel signals by the RF transceivers 210a-210n, the RX processing circuitry 220, and the TX processing circuitry 215 in accordance with well-known principles. The controller/processor 225 could support additional functions as well, such as more advanced wireless communication functions. For instance, the controller/processor 225 could support beam forming or directional routing operations in which outgoing/incoming signals from/to multiple antennas 205a-205n are weighted differently to effectively steer the outgoing signals in a desired direction. Any of a wide variety of other functions could be supported in the gNB 102 by the controller/processor 225.

The controller/processor 225 is also capable of executing programs and other processes resident in the memory 230, such as an OS. The controller/processor 225 can move data into or out of the memory 230 as required by an executing process.

The controller/processor 225 is also coupled to the backhaul or network interface 235. The backhaul or network interface 235 allows the gNB 102 to communicate with other devices or systems over a backhaul connection or over a network. The interface 235 could support communications over any suitable wired or wireless connection(s). For example, when the gNB 102 is implemented as part of a cellular communication system (such as one supporting 5G/NR, LTE, or LTE-A), the interface 235 could allow the gNB 102 to communicate with other gNBs over a wired or wireless backhaul connection. When the gNB 102 is implemented as an access point, the interface 235 could allow the gNB 102 to communicate over a wired or wireless local area network or over a wired or wireless connection to a larger network (such as the Internet). The interface 235 includes any suitable structure supporting communications over a wired or wireless connection, such as an Ethernet or RF transceiver.

The memory 230 is coupled to the controller/processor 225. Part of the memory 230 could include a RAM, and another part of the memory 230 could include a Flash memory or other ROM.

Although FIG. 2 illustrates one example of gNB 102, various changes may be made to FIG. 2. For example, the gNB 102 could include any number of each component shown in FIG. 2. As a particular example, an access point could include a number of interfaces 235, and the controller/processor 225 could support routing functions to route data between different network addresses. As another particular example, while shown as including a single instance of TX processing circuitry 215 and a single instance of RX processing circuitry 220, the gNB 102 could include multiple instances of each (such as one per RF transceiver). Also, various components in FIG. 2 could be combined, further subdivided, or omitted and additional components could be added according to particular needs.

FIG. 3 illustrates an example UE 116 according to embodiments of the present disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of this disclosure to any particular implementation of a UE.

As shown in FIG. 3, the UE 116 includes an antenna 305, a radio frequency (RF) transceiver 310, TX processing circuitry 315, a microphone 320, and receive (RX) processing circuitry 325. The UE 116 also includes a speaker 330, a processor 340, an input/output (I/O) interface (IF) 345, a touchscreen 350, a display 355, and a memory 360. The memory 360 includes an operating system (OS) 361 and one or more applications 362.

The RF transceiver 310 receives, from the antenna 305, an incoming RF signal transmitted by a gNB of the network 100. The RF transceiver 310 down-converts the incoming RF signal to generate an intermediate frequency (IF) or baseband signal. The IF or baseband signal is sent to the RX processing circuitry 325, which generates a processed baseband signal by filtering, decoding, and/or digitizing the baseband or IF signal. The RX processing circuitry 325 transmits the processed baseband signal to the speaker 330 (such as for voice data) or to the processor 340 for further processing (such as for web browsing data).

The TX processing circuitry 315 receives analog or digital voice data from the microphone 320 or other outgoing baseband data (such as web data, e-mail, or interactive video game data) from the processor 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or IF signal to an RF signal that is transmitted via the antenna 305.

The processor 340 can include one or more processors or other processing devices and execute the OS 361 stored in the memory 360 in order to control the overall operation of the UE 116. For example, the processor 340 could control the reception of forward channel signals and the transmission of reverse channel signals by the RF transceiver 310, the RX processing circuitry 325, and the TX processing circuitry 315 in accordance with well-known principles. In some embodiments, the processor 340 includes at least one microprocessor or microcontroller.

The processor 340 is also capable of executing other processes and programs resident in the memory 360, such as processes for beam management. The processor 340 can move data into or out of the memory 360 as required by an executing process. In some embodiments, the processor 340 is configured to execute the applications 362 based on the OS 361 or in response to signals received from gNBs or an operator. The processor 340 is also coupled to the I/O interface 345, which provides the UE 116 with the ability to connect to other devices, such as laptop computers and handheld computers. The I/O interface 345 is the communication path between these accessories and the processor 340.

The processor 340 is also coupled to the touchscreen 350 and the display 355. The operator of the UE 116 can use the touchscreen 350 to enter data into the UE 116. The display 355 may be a liquid crystal display, light emitting diode display, or other display capable of rendering text and/or at least limited graphics, such as from web sites.

The memory 360 is coupled to the processor 340. Part of the memory 360 could include a random access memory (RAM), and another part of the memory 360 could include a Flash memory or other read-only memory (ROM).

Although FIG. 3 illustrates one example of UE 116, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). Also, while FIG. 3 illustrates the UE 116 configured as a mobile telephone or smartphone, UEs could be configured to operate as other types of mobile or stationary devices.

To meet the demand for wireless data traffic having increased since deployment of 4G communication systems and to enable various vertical applications, efforts have been made to develop and deploy an improved 5G/NR or pre-5G/NR communication system. Furthermore, discussions on use cases and deployment scenarios for 5G NR systems operating beyond 52.6 GHz bands have already begun, and support for operation in these bands will be included in 3GPP Release 16. Following this trend, it is inevitable that telecommunications will utilize the terahertz (THz) bands for future wireless systems. Therefore, the 5G/NR or future 6G communication system will likely utilize a terahertz (THz) bands The 5G/NR communication system is considered to be implemented in higher frequency (mmWave) bands, e.g., 28 GHz or 60 GHz bands, so as to accomplish higher data rates or in lower frequency bands, such as 6 GHz, to enable robust coverage and mobility support. The THz band is here defined as the frequencies ranging from 0.1 THz to 10 THz, which aligns with some publications such as. A total of 102 GHz spectrum in the range between 95 GHz and 300 GHz is being made accessible for licensed fixed point-to-point and mobile services through the Spectrum Horizon program. Accordingly, the extremely wideband THz channels with tens of GHz-wide bandwidth could potentially support the Tbps communication envisioned by the future 6G standard. The present disclosure may also be applied to deployment of 5G communication system, 6G or even later release that may use THz bands. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G/NR communication systems.

In addition, in 5G/NR communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like.

A communication system includes a downlink (DL) that refers to transmissions from a base station or one or more transmission points to UEs and an uplink (UL) that refers to transmissions from UEs to a base station or to one or more reception points.

A time unit for DL signaling or for UL signaling on a cell is referred to as a slot and can include one or more symbols. A symbol can also serve as an additional time unit. A frequency (or bandwidth (BW)) unit is referred to as a resource block (RB). One RB includes a number of sub-carriers (SCs). For example, a slot can have duration of 0.5 milliseconds or 1 millisecond, include 14 symbols and an RB can include 12 SCs with inter-SC spacing of 15 KHz or 30 KHz, and so on.

DL signals include data signals conveying information content, control signals conveying DL control information (DCI), and reference signals (RS) that are also known as pilot signals. A gNB transmits data information or DCI through respective physical DL shared channels (PDSCHs) or physical DL control channels (PDCCHs). A PDSCH or a PDCCH can be transmitted over a variable number of slot symbols including one slot symbol. For brevity, a DCI format scheduling a PDSCH reception by a UE is referred to as a DL DCI format and a DCI format scheduling a physical uplink shared channel (PUSCH) transmission from a UE is referred to as an UL DCI format.

A gNB transmits one or more of multiple types of RS including channel state information RS (CSI-RS) and demodulation RS (DMRS). A CSI-RS is primarily intended for UEs to perform measurements and provide CSI to a gNB. For channel measurement, non-zero power CSI-RS (NZP CSI-RS) resources are used. For interference measurement reports (IMRs), CSI interference measurement (CSI-IM) resources associated with a zero power CSI-RS (ZP CSI-RS) configuration are used. A CSI process includes NZP CSI-RS and CSI-IM resources.

A UE can determine CSI-RS transmission parameters through DL control signaling or higher layer signaling, such as radio resource control (RRC) signaling, from a gNB. Transmission instances of a CSI-RS can be indicated by DL control signaling or be configured by higher layer signaling. A DMRS is transmitted only in the BW of a respective PDCCH or PDSCH and a UE can use the DMRS to demodulate data or control information.

Figure 4:
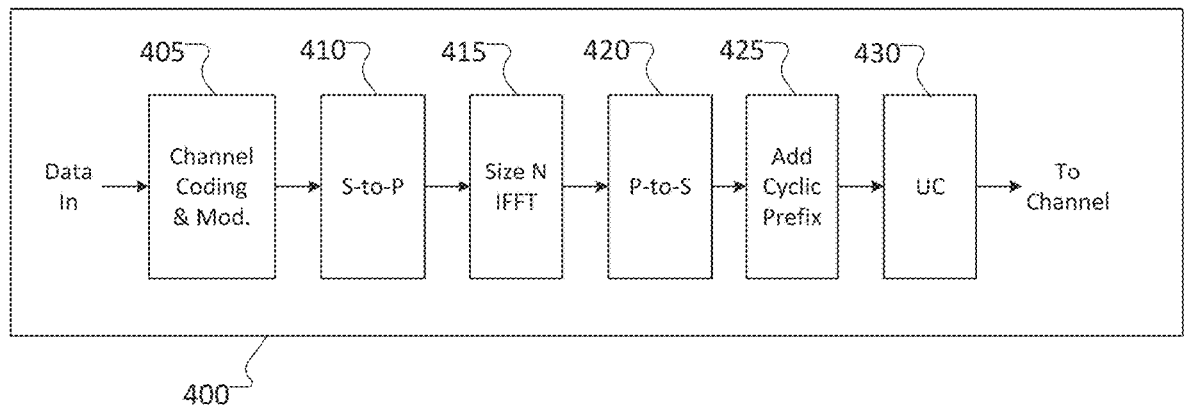
FIGS. 4 and 5 illustrate example wireless transmit and receive paths according to this disclosure.
Figure 5:
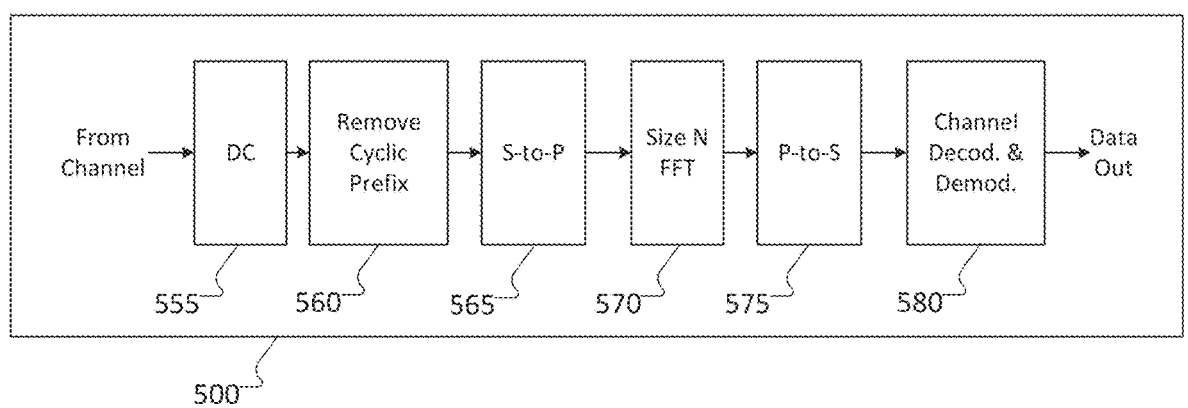

FIG. 4 and FIG. 5 illustrate example wireless transmit and receive paths according to this disclosure. In the following description, a transmit path 400 may be described as being implemented in a gNB (such as the gNB 102), while a receive path 500 may be described as being implemented in a UE (such as a UE 116). However, it may be understood that the receive path 500 can be implemented in a gNB and that the transmit path 400 can be implemented in a UE. In some embodiments, the receive path 500 is configured to support adapting a channel sensing threshold as described in embodiments of the present disclosure.

The transmit path 400 as illustrated in FIG. 4 includes a channel coding and modulation block 405, a serial-to-parallel (S-to-P) block 410, a size N inverse fast Fourier transform (IFFT) block 415, a parallel-to-serial (P-to-S) block 420, an add cyclic prefix block 425, and an up-converter (UC) 430. The receive path 500 as illustrated in FIG. 5 includes a down-converter (DC) 555, a remove cyclic prefix block 560, a serial-to-parallel (S-to-P) block 565, a size N fast Fourier transform (FFT) block 570, a parallel-to-serial (P-to-S) block 575, and a channel decoding and demodulation block 580.

As illustrated in FIG. 4, the channel coding and modulation block 405 receives a set of information bits, applies coding (such as a low-density parity check (LDPC) coding), and modulates the input bits (such as with quadrature phase shift keying (QPSK) or quadrature amplitude modulation (QAM)) to generate a sequence of frequency-domain modulation symbols.

The serial-to-parallel block 410 converts (such as de-multiplexes) the serial modulated symbols to parallel data in order to generate N parallel symbol streams, where N is the IFFT/FFT size used in the gNB 102 and the UE 116. The size N IFFT block 415 performs an IFFT operation on the N parallel symbol streams to generate time-domain output signals. The parallel-to-serial block 420 converts (such as multiplexes) the parallel time-domain output symbols from the size N IFFT block 415 in order to generate a serial time-domain signal. The add cyclic prefix block 425 inserts a cyclic prefix to the time-domain signal. The up-converter 430 modulates (such as up-converts) the output of the add cyclic prefix block 425 to an RF frequency for transmission via a wireless channel. The signal may also be filtered at baseband before conversion to the RF frequency.

A transmitted RF signal from the gNB 102 arrives at the UE 116 after passing through the wireless channel, and reverse operations to those at the gNB 102 are performed at the UE 116.

As illustrated in FIG. 5, the down-converter 555 down-converts the received signal to a baseband frequency, and the remove cyclic prefix block 560 removes the cyclic prefix to generate a serial time-domain baseband signal. The serial-to-parallel block 565 converts the time-domain baseband signal to parallel time domain signals. The size N FFT block 570 performs an FFT algorithm to generate N parallel frequency-domain signals. The parallel-to-serial block 575 converts the parallel frequency-domain signals to a sequence of modulated data symbols. The channel decoding and demodulation block 580 demodulates and decodes the modulated symbols to recover the original input data stream.

Each of the gNBs 101-103 may implement a transmit path 400 as illustrated in FIG. 4 that is analogous to transmitting in the downlink to UEs 111-116 and may implement a receive path 500 as illustrated in FIG. 5 that is analogous to receiving in the uplink from UEs 111-116. Similarly, each of UEs 111-116 may implement the transmit path 400 for transmitting in the uplink to the gNBs 101-103 and may implement the receive path 500 for receiving in the downlink from the gNBs 101-103.

Each of the components in FIG. 4 and FIG. 5 can be implemented using only hardware or using a combination of hardware and software/firmware. As a particular example, at least some of the components in FIG. 4 and FIG. 5 may be implemented in software, while other components may be implemented by configurable hardware or a mixture of software and configurable hardware. For instance, the FFT block 570 and the IFFT block 515 may be implemented as configurable software algorithms, where the value of size N may be modified according to the implementation.

Furthermore, although described as using FFT and IFFT, this is by way of illustration only and may not be construed to limit the scope of this disclosure. Other types of transforms, such as discrete Fourier transform (DFT) and inverse discrete Fourier transform (IDFT) functions, can be used. It may be appreciated that the value of the variable N may be any integer number (such as 1, 2, 3, 4, or the like) for DFT and IDFT functions, while the value of the variable N may be any integer number that is a power of two (such as 1, 2, 4, 8, 16, or the like) for FFT and IFFT functions.

Although FIG. 4 and FIG. 5 illustrate examples of wireless transmit and receive paths, various changes may be made to FIG. 4 and FIG. 5. For example, various components in FIG. 4 and FIG. 5 can be combined, further subdivided, or omitted and additional components can be added according to particular needs. Also, FIG. 4 and FIG. 5 are meant to illustrate examples of the types of transmit and receive paths that can be used in a wireless network. Any other suitable architectures can be used to support wireless communications in a wireless network.

This disclosure focuses on overall 140 GHz system; RF specifications; a baseband modem specification and design; and a system architecture and signal processing. Embodiments of the present discloser provide an antenna system and transceiver architecture that provide an end-to-end 140 gigahertz (GHz) fully digital beamformed system. Certain embodiments of the present disclosure provide a 144 GHz wireless link prototype capable of operating in lower THz bands for wireless communications. Embodiments of the present disclosure also provide a real-time link with adaptive beam steering, which further provide data-rate of 6.3 Gbps at 15-meter distance in a 2 GHz of bandwidth.

Figure 6:
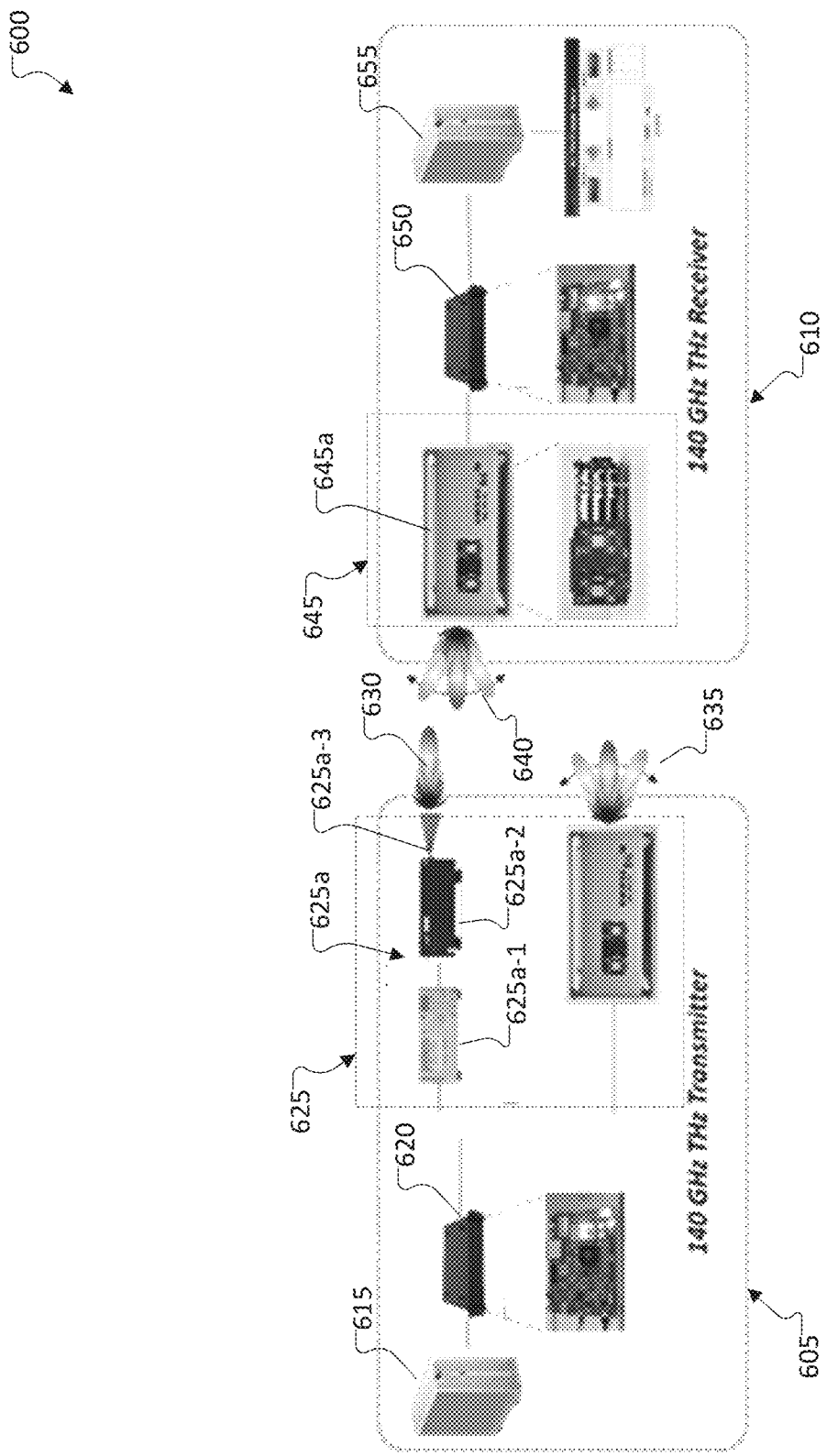
FIG. 6 illustrate an example of an end-to-end system according to embodiments of the present disclosure.

FIG. 6 illustrate an example of an end-to-end system 600 according to embodiments of the present disclosure. An embodiment of the end-to-end system 600 shown in FIG. 6 is for illustration only. Other embodiments can be used without departing from the scope of the present disclosure.

The end-to-end system 600 includes a transmitter 605 and a receiver 610. The transmitter 605 can be a 140 GHz transmitter. Additionally, portions of transmitter 605 can be included in, or part of, one or more of: RF transceivers 210a-210n or transceiver 310. The receiver 610 can be a 140 GHz receiver. Additionally, portions of receiver 610 can be included in, or part of, one or more of: RF transceivers 210a-210n or transceiver 310.

Data is generated by the host-PC 615 at the transmitter 605 side. The data sent to the modem 620, which includes baseband and data-convertors, then to the RF unit 625. One of the following RF units 625 are used at the transmitter side: a) Fixed-beam RF 625a, which consists of the Keysight I/Q modulator 625a-1, VDI up-convertor 625a-2, and lens antenna 625a-3; orb) TX-beamformer RF 625b, which is described herein below with respect to FIGS. 7-11. The transmitter 605 transmits the signal via a single beam 630 or via multiple beamformed beams 635. The transmitted signal 640 is received by the receiver RF 645 in the receiver 610. For example, the receiver RF 645 includes digital beamformers RF 645a. The receiver RF 645 down-converts the signal to baseband. The baseband signal is digitized then processed by the digital beamformers 645a and the baseband modem 650. Finally, the recovered data is sent to the host-PC 655 at the receiver 610 side.

Figure 7:
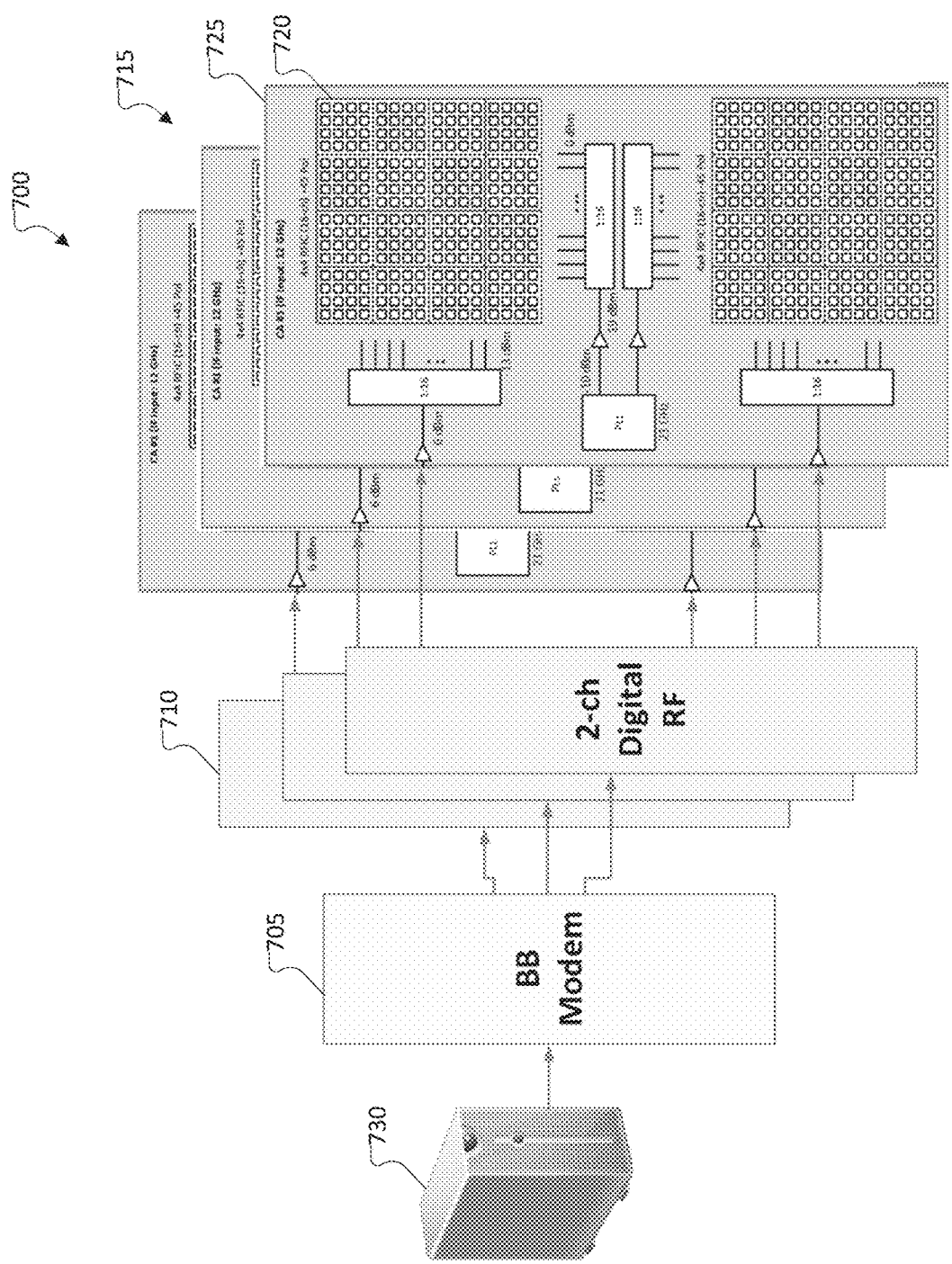
FIG. 7 illustrates an example architecture for a transmitter or receiver according to embodiments of the present disclosure.

FIG. 7 illustrates an example architecture 700 for a transmitter or receiver according to embodiments of the present disclosure. The embodiment of the architecture 700 shown in FIG. 7 is for illustration only. Other embodiments can be used without departing from the scope of the present disclosure. The transmitter can be the same as or similar to transmitter 605. The receiver can be the same as or similar to receiver 610.

The architecture 700 includes a baseband modem 705, a number of 2-channel digital RF 710 and a number of antennas 715. The architecture 700 is configured to perform hybrid beamforming. There are two digital chains per carrier, and each channel will feed 256 RF channels. This architecture 700 is configured to reduce the number of high-speed data convertors, DACs and ADCs; and alleviate the burden on the digital IO interface to these convertors. The architecture 700 is further adapted for scalability using carrier-aggregation. That is, there are three carriers and each carrier has 4 GHz of bandwidth for a total link bandwidth of 12 GHz. The architecture 700 is also further adapted for scalability using a radio frequency integrated circuit (RFIC) 720 tiling architecture: That is, each antenna 715 includes a number of RFICs 720, and each RFIC 720 is configured for a number of RF channels coupled to an n×n antenna array. For example, each RFIC 720 can include 16 RF-channels feeding a sub-array of 4×4 on-package-elements. In certain embodiments, the chips can be tiled in a 4×4 grid forming 256-element array. Although a 4×4 array is depicted, arrays of different dimension arrays can be utilized without departing from the scope of the present disclosure. The architecture 700 is further adapted for polarized MIMO. That is, each panel 725 can include two tiled-arrays (RFIC's 720) with orthogonal polarization to improve the rank of the LoS channel and hence improve the spectral efficiency.

Data is received from a processor or host pc 730 and processed through the baseband modem 705. The data is passed through digital chains, namely the 2-channel digital RF 710, which perform beamforming. The beamformed data is then distributed to each of the tiled arrays in the antenna arrays 715.

Figure 8:
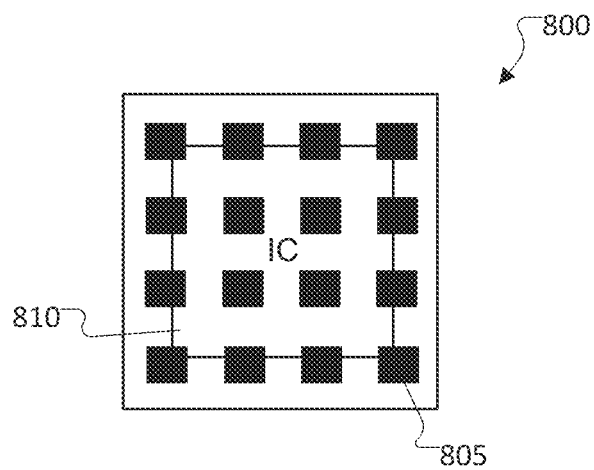
FIG. 8 illustrates an example antenna tile according to embodiments of the present disclosure.

FIG. 8 illustrates an example antenna tile 800 according to embodiments of the present disclosure. The embodiment of the antenna tile 800 shown in FIG. 8 is for illustration only. Other embodiments can be used without departing from the scope of the present disclosure.

The antenna tile 800 includes an n×n array of antenna elements 805 and a radio frequency integrated circuit (RFIC) 910. In certain embodiments, the antenna tile 800 is configured as a single chip with an RFIC 810 coupled to an array of antenna elements. In certain embodiments, the antennal elements are configured as an antenna-array-in-package comprising a plurality of antenna elements 805. The RFIC can be the same as RFIC 720. In certain embodiments, the RFIC 810 is single-channel (1-ch.) intermediate-frequency (IF) input, namely one digital channel, to a multi-channel RF output circuit on a transmitter side, such as transmitter 605. Additionally, the RFIC 810 is single-channel (1-ch.) intermediate-frequency (IF) input, multi-channel RF output circuit on a transmitter side, such as receiver 610. In the example illustrated in FIG. 8, the RFIC 810 is a 1-ch IF input to sixteen-channel (16-ch) RF output RFIC coupled to a 4×4 antenna-array on package. As such, the 1-ch IF to 16-ch RF RFIC includes 16 transmitters inside the circuit with 16 antenna elements. Alternatively, the RFIC 810 can be a 16-ch RF input, 1-ch IF output RFIC coupled to 4×4 Antenna-array on package. The antenna tile 800 include n×j RF channels that are beamformed using analog phase shifters. For example, as shown in FIG. 8, the antenna tile 800 can include 16 channels. Although an antenna tile having 16 antenna elements and 16 channels is depicted, any number of antenna elements and channels could be used.

Figure 9:
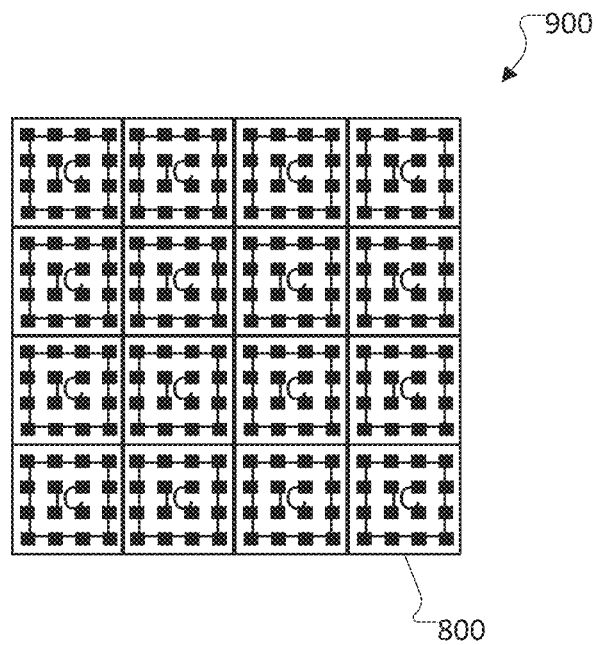
FIG. 9 illustrates an example antenna array according to embodiments of the present disclosure.

FIG. 9 illustrates an example antenna array 900 according to embodiments of the present disclosure. The embodiment of the antenna array 900 shown in FIG. 9 is for illustration only. Other embodiments can be used without departing from the scope of the present disclosure. The antenna array 900 can be the same as, or similar to, antennas 715, antenna 205, or antenna 305.

In certain embodiments, the antenna architecture is configured for scalability using multiple antenna tiles 800. The antenna tiles 800 are coupled together to form an m×k antenna array 900 having m×k antenna tiles 800. In the example shown in FIG. 9, the antenna array 900 comprises a 16-ch IF, 256-ch RF system by tiling 4×4 antenna tiles. The 16 IF channels are beamformed using an analog phase-shifter on the tile IF input; or an analog phase-shifter on the tile local oscillator (LO) input. Alternatively, 16 IF channels are digitized then beamformed in the digital domain.

Figure 10:
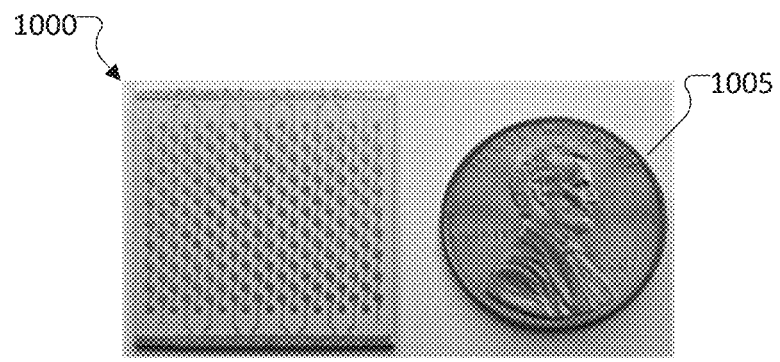
FIG. 10 illustrates an example 10×9 sided antenna tile according to embodiments of the present disclosure.

In certain embodiments, the tiled antenna array 900 is configured with 4×4 antenna tile 800 and each tile is a 4×4 and 10×9 sided array 1000 as shown in FIG. 10 and dimensioned to be approximately ¾ of an inch square. For example, in FIG. 10, the 4×4 and 10×9 sided array 1000 is compared to a U.S. penny 1005.

Figure 11:
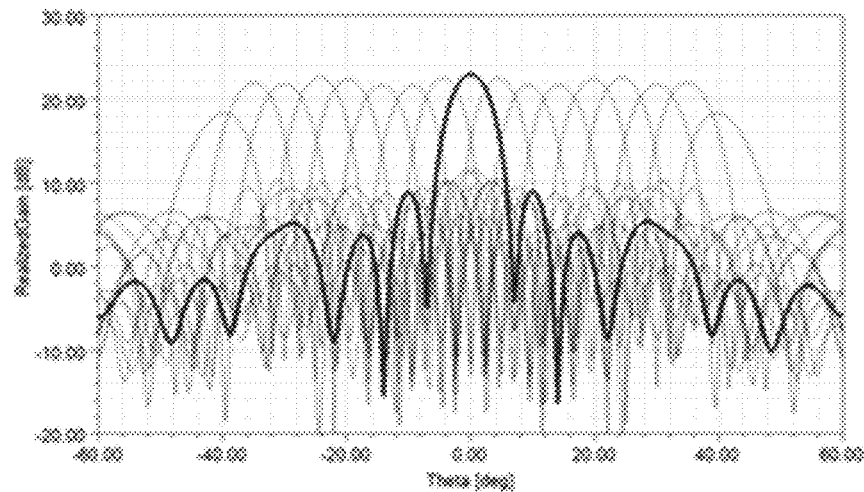
FIG. 11 illustrates an example antenna pattern according to embodiments of the present disclosure.

A 128-element antenna array, made using regular PCB fabrication process, is used at the TX beamformer, and a similar array is used at the RX beamformer. The array is developed to achieve 21 dBi gain with a scanning range of +/−40 degree in azimuth direction. The simulated beam patterns of the 4×4 and 10×9 sided array 1000 steered in different azimuth angles are depicted in FIG. 11. The array includes 20 sub-arrays in which 16 of these sub-arrays are driven by the RF chains, while the other 4 sub-arrays (two at each side) are dummy subarray to keep the symmetry for the edge sub-arrays. Each sub-array consists of 8 radiating patch antennas plus a termination element. The elements of the sub-array are serially fed circular patches with insets. Note the array has 180 elements, but only 128 elements are radiating elements.

Figure 12:
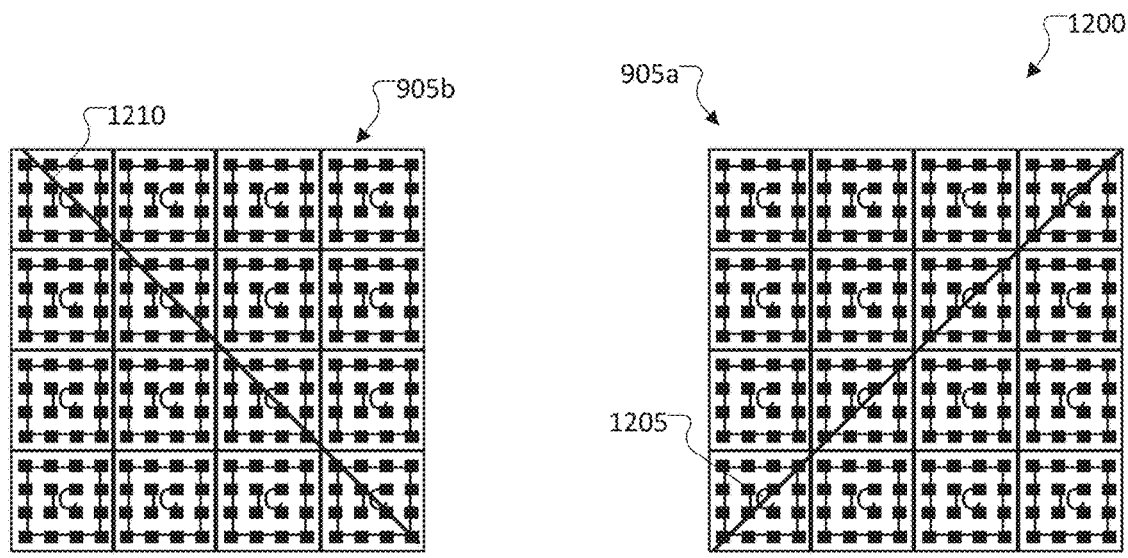
FIG. 12 illustrates an example polarization of antenna arrays according to embodiments of the present disclosure.

FIG. 12 illustrates an example polarization of antenna arrays according to according to embodiments of the present disclosure. The embodiment of the polarized antenna arrays 1200 shown in FIG. 12 is for illustration only. Other embodiments can be used without departing from the scope of the present disclosure. The antenna arrays 1200 can be the same as, or similar to, antennas 715, antenna 205, or antenna 305.

In certain embodiments, different antenna arrays 900 transmit signals at different polarities. An electrical signal has polarity, which is a reference to the signal's position or voltage above or below the median line, or its orientation electrical field of the electromagnetic signal. Different polarities of a signal reference a difference or swapping of positive voltage to negative voltage with respect to another electrical signal. For example, a first antenna array 900a is configured to transmit at a first polarization 1205, as depicted by a line to illustrate the variation of the electrical field for the signal for convenience of illustration and discussion. Additionally, a second antenna array 900b is configured to transmit at a second polarization 1210, as depicted by a line to illustrate the variation of the electrical field for the signal for convenience of illustration and discussion.

In the example illustrated in FIG. 12, a 45° polarization is illustrated for each antenna array. To transmit at different polarization, the antenna tiles 800 in the second antenna array 905b are rotated by 90° with respect to the antenna tiles 800 in the first antenna array 905a. In certain embodiments, a 45° polarized antenna is feed from two sides.

Figure 13:
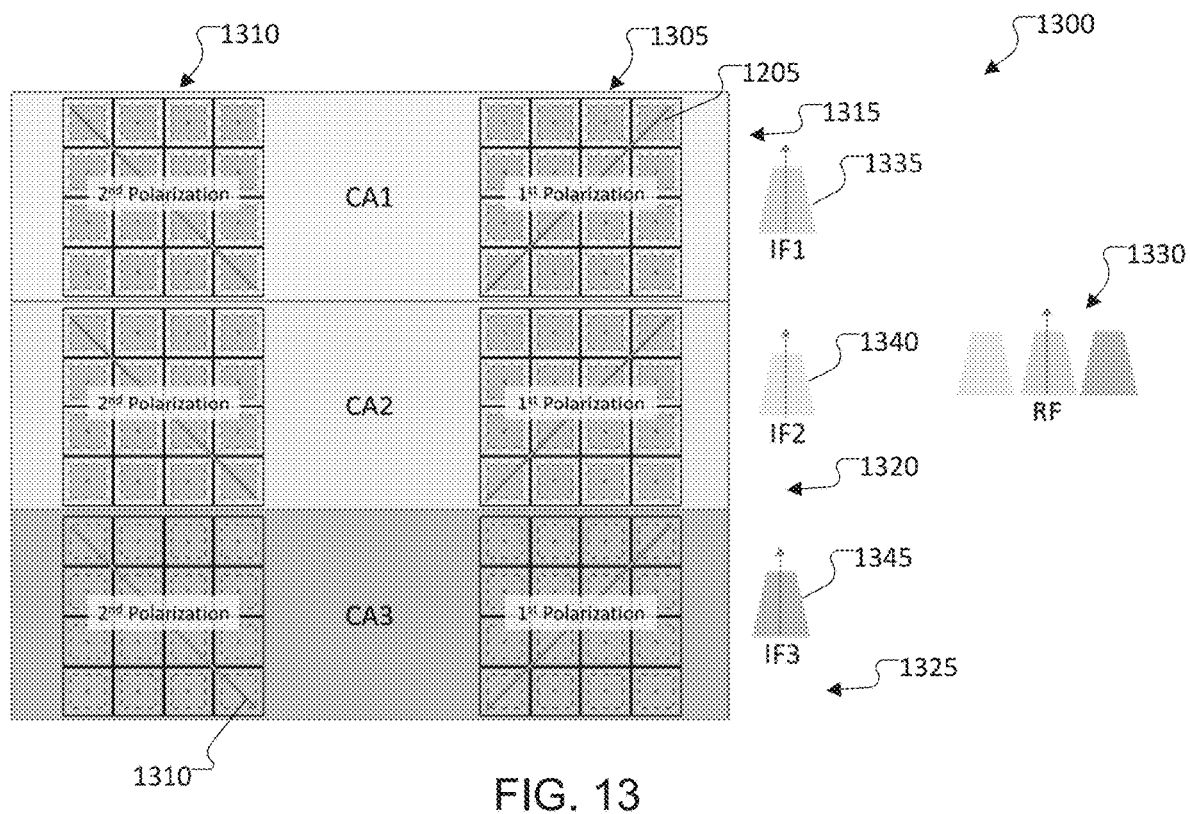
FIG. 13 illustrates an example for carrier aggregation scaling according to embodiments of the present disclosure.

FIG. 13 illustrates an example for carrier aggregation scaling according to embodiments of the present disclosure. The embodiment of the carrier aggregation scaling shown in FIG. 13 is for illustration only. Other embodiments could be used without departing from the scope of the present disclosure.

A base-tile array 1300 includes multiple antenna arrays 900 that are coupled together, in which a first set of arrays 1305 has a number of antenna arrays 900 configured to transmit at a first polarization 1205 and a second set of arrays 1310 has a number of arrays 900 configured to transmit at a second polarization 1210. That is, a first antenna array 900 having the first polarization 1205 is replicated multiple times to create the first set of arrays 1305 and a second antenna array 900 having the second polarization 1210 is replicated multiple times to create the second set of arrays 1310. It is noted that, at higher frequency above 100 GHz, the output power of each tile 800 is not high due to a limitation of the RFIC 810. Additionally, the available bandwidth is getting wider and wider with channels of 10 GHz, 20 GHz, and so forth. Note, the 140 GHz has 25× area advantage over 28 GHz. (i.e., comparing the area of two antenna-arrays with the same gain, the one at 140 GHZ is 25 times smaller.)

Instead of transmitting all the bandwidth using one tiled array, the bandwidth is divided into N sections, each transmitted from a different tiled array. This means N PAs will handle the whole band. The bandwidth can be partitioned by filters or by design. For example, in the example shown in FIG. 13, the signal is divided into three bars of 3 GHz each such that the base tile antenna array includes a first CA group (CA1) 1315; a second CA group (CA2) 1320; and a third CA group (CA3) 1325. Each of the CA groups transmits their respective signal, which looks like a single full signal 1330. That is, CA1 1315 transmits IF1 1335, CA2 transmits IF2 1340, and CA3 transmits IF3 1345. Each of the arrays 900 are tuned to such that IF1 1335, IF2 1340, and IF3 1345 are transmitted next to each other and, as such, appear as full signal 1330.

It is noted that transmissions at low frequency require larger antenna elements and larger RF circuits. Therefore, replication of elements to create base-tile antenna arrays may not be advantageous. In contrast, at high frequency, above 100 GHz, the small size of the antenna elements allows for replication without an excessive area requirement. For example, transitioning from 28 GHz to 140 GHz, the area of the two antenna-arrays with the same gain is substantially different in which the antenna array at 140 GHZ is 25 times smaller than the 28 GHz antenna array. In this way one trade area for transmission power. This is important in THz as: in 140 GHz, state-of-the-art PA has output power ~10 dB lower than that at 28 GHz; and available bandwidth in THz $10x$ more than that in mmWave.

Figure 14:
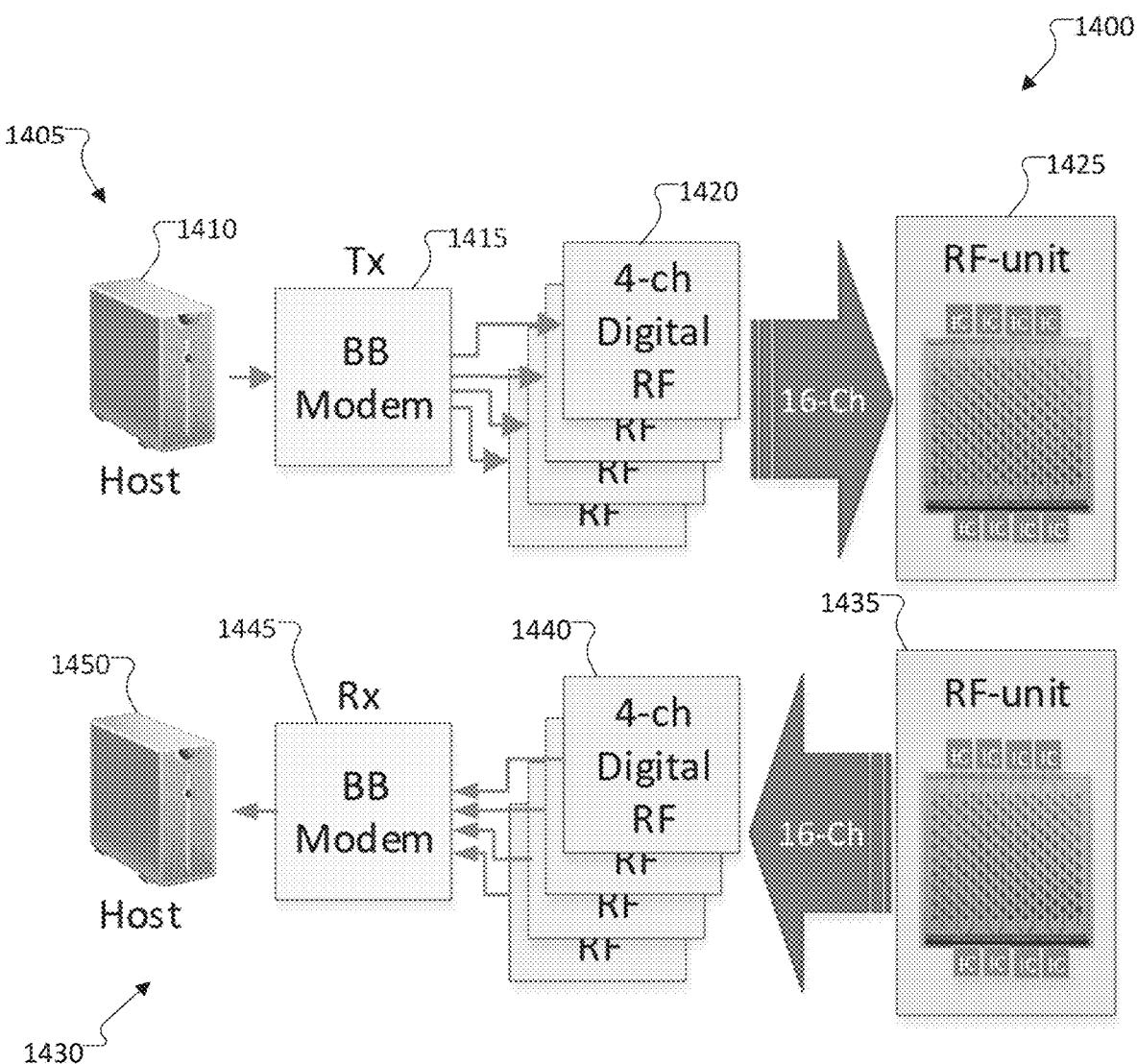
FIG. 14 illustrates an example high bandwidth system architecture according to embodiments of the present disclosure.

FIG. 14 illustrates an example high bandwidth system architecture according to embodiments of the present disclosure. The embodiment of the high bandwidth system architecture 1400 shown in FIG. 14 is for illustration only. Other embodiments could be used without departing from the scope of the present disclosure.

The high bandwidth system architecture 1400 implements a single-carrier waveform, and has the frame structure, such as illustrated herein below with respect to FIG. 17. Each frame is 25 ms in length and consists of a 1 ms beamforming training session and 24 ms data session. The beamforming training session includes 625 beamforming training intervals (BFTI), which can track 25 transmit beams and 25 receive beams every 25 ms assuming exhaustive search algorithm. The data session consists of 120 data-slots to allow channel tracking and equalization every 200 us. Moreover, each data-slot is formed of 758 single-carrier blocks (SC-Block) and a single channel estimation field (CEF), such as illustrated in FIG. 18. Each SC-Block is 512 symbols long, of them 480 symbols are data, and 32 symbols are guard-pilots. The guard-pilots are used to facilitate frequency-domain equalization and to track phase-noise. The CEF is constructed using complimentary Golay sequences.

In the TX beamformer, the I/Q baseband signal is replicated 16 times, each replica is rotated using the digital phase-shifter, processed to apply the transmitter I/Q imbalance and phase calibration, then fed to the digital-to-analog convertor (DAC). In one example, this part is implemented using four Xilinx ZU28DR RFSoC, called digital RF FPGA, where each FPGA processes four I/Q channels.

The RX beamformer has similar structure as that of the TX. The 144 GHz is directly down-converted to the I/Q baseband signal using the CMOS RX RFIC. A total of eight RFICs are used, each has two channels. The conversion gain for this RFIC is 12 dB, and the noise figure is 10 dB. The I/Q signals are sampled using the 4 Gsps analog-to-digital convertors (ADC) on the digital RF board. The digitized signals are rotated using digital-phase shifter, then combined and passed to the baseband modem.

On the transmitter side 1405, a host pc 1410 generates traffic including data, and sends the traffic over Ethernet to the baseband modem 1415 field programmable gate array (FPGA). The baseband modem 1415 encodes the data, then sends four similar copies over a common public radio interface (CPRI) to the four digital RF FPGAs 1420. Each one of the digital RF FPGAs 1420 modulates the data, constructs the frames, then resamples and filters the signal using a root-raised-cosine (RRC) filter with roll-off factor 0.2. The signal is replicated four times, each replica is rotated using the digital phase-shifter, processed to apply the transmitter I/Q imbalance and phase calibration, then fed to the DACs. Thereafter, the signal is transmitted via RF-unit 1425 having base-tile antenna arrays 1300.

On the receiver side 1430, the signal is received via a RF-unit 1435 having base-tile antenna arrays 1300. The analog baseband signals form the RF-unit 1435 are digitized using the ADCs in the digital RF FPGA 1440, four channels at each digital RF FPGA 1440. Each channel is corrected for I/Q imbalance and phase-mismatch, then rotated using digital-phase shifters according to a preloaded beamforming table. The four channels are then combined, filtered using the matching filter. The output of the matching filter is then passed to the synchronization module, channel estimation module, equalizer, then phase-tracking. The synchronization module signals the start of a CEF in a data-slot to the channel estimation module. The channel estimation module captures the received CEF and estimates the channel, then passes the estimation to the equalizer. The equalizer converts the time-domain channel to the frequency domain using 512 FFT, then uses it to equalize the received SC-block one-by-one in the frequency domain. The equalizer implements a fractionally spaced equalizer (FSE) with 2× oversampling to alleviate the receiver sensitivity to sampling offset impairment. The equalized symbols are processed using the phase-noise tracking module, which corrects for the common phase-error in the SC-block. The output of the phase-noise module is sent to the baseband modem 1445 FPGA, which averages the corresponding four symbols from the four digital RF boards (RF FPGAs 1440), demodulates the averaged symbols into soft log-likelihood-ratios (LLRs), decodes the LLRs and recovers the information bits, packages the data into IP packets, then sends them to the host PC 1450.

A high bandwidth transceiver architecture includes a central unit and multiple distributed units, wherein the plurality of distributed units jointly form a beam, and wherein the partitioning of the transceiver modules are unsymmetrical on the transmitter direction and the receiver direction. In the transmitter direction, multiple encoded bits replica are sent to the distributed units, and modulation is done on the distributed units. In the receiver direction, the equalized symbols are sent to the central units, and demodulation is done in a central unit.

Figure 15:
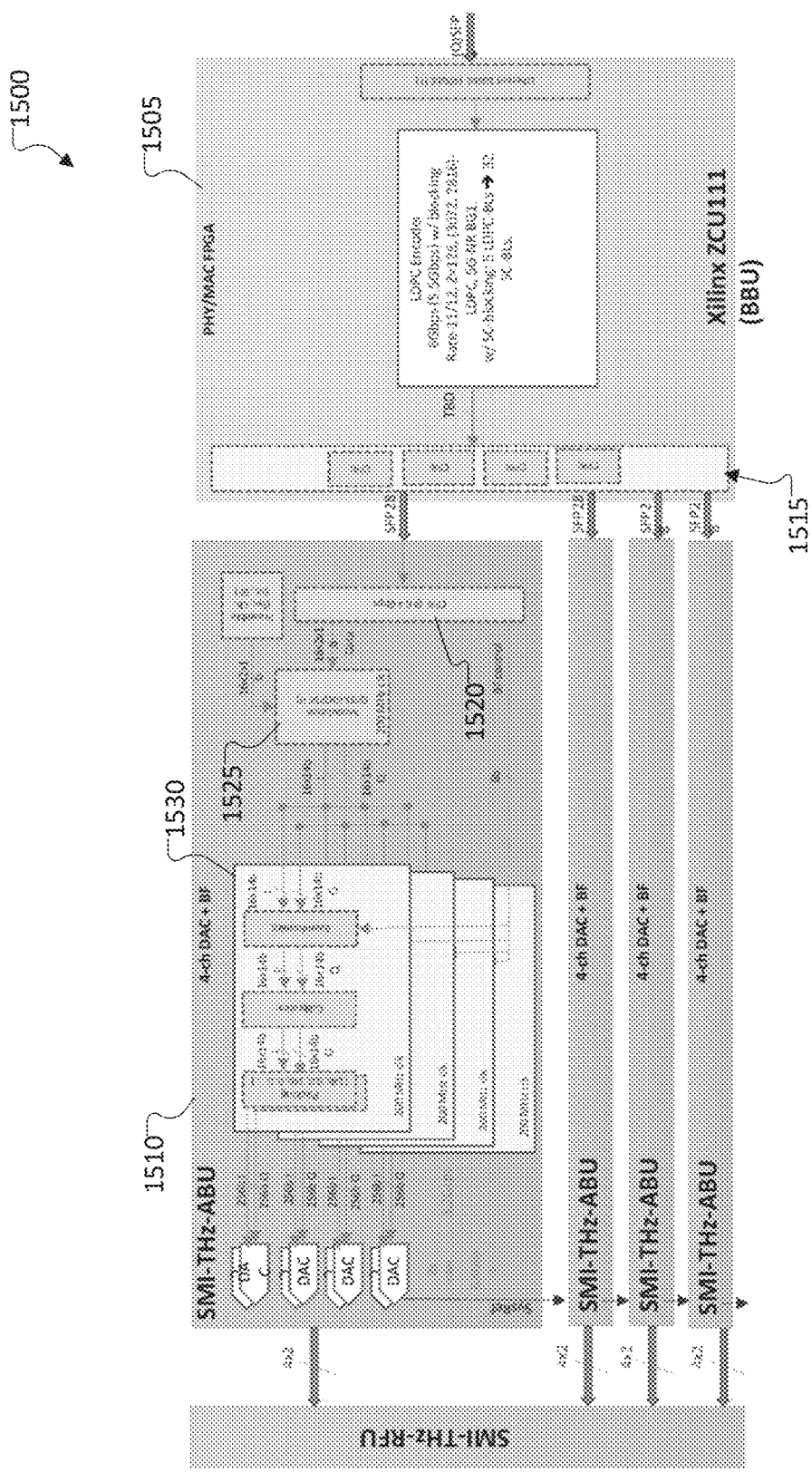
FIG. 15 illustrates an example high bandwidth transceiver architecture according to embodiments of the present disclosure.

FIG. 15 illustrates an example high bandwidth transceiver architecture according to embodiments of the present disclosure. The embodiment of the high bandwidth transceiver architecture 1500 shown in FIG. 15 is for illustration only. Other embodiments could be used without departing from the scope of the present disclosure. In the example shown in FIG. 15, a transmitter side operation is illustrated. The transmitter side transceiver can be the same as or similar to as transceivers 210 or 310. The high bandwidth transceiver architecture 1500 is configured to perform modulator redundant replication to reduce the throughput requirement on the interface.

The high bandwidth transceiver architecture 1500 includes a central processor unit (BBU) 1505 and multiple distributed processor units (ABU's) 1510. That is, the BBU 1505 comprises a processor, or processing circuitry, configured to operate as a central processor and each ABU 1510 comprises a processor, or processing circuitry, configured to operate as one of the distributed processors. In the example illustrated in FIG. 15, the high bandwidth transceiver architecture 1500 includes four ABU's 1510. The ABUs 1510 can be comprised of FPGA's or chips, such as defined semiconductor circuits. The high bandwidth transceiver architecture 1500 provides for unsymmetrical partitioning for Tx and Rx interfaces.

The BBU 1505 first performs all bit processing. The BBU 1505, with the ABUs, 1510 carry the file structure, including data to be transmitted, and, as such, define a modem, such as modem 1415 in FIG. 14. The BBU 1505 partitions the file structure such that a portion of the file structure goes to each ABU 1510. That is, the BBU 1505 encodes the data bits and transmits the encoded data bits through interface 1515. In certain embodiments, the BBU 1505 replicas the encoded data bits and transmits the replica data to each of the ABUs' 1510. In certain embodiments, the interface comprises one or more CPRI. Each ABU 1510 receives a replica of the encoded bits via CPRI 1520 and modulates the bits, such as via QPSK, in modulator 1525. In certain embodiments, the modulator 1525 is included in the BBU 1505 and modulation is performed prior to partitioning. When the modulator 1525 is disposed in the BBU 1505, more bits are required to be transmitted over interface 1515. For example, instead of sending 2 bits over interface 1515, the BBU 1505 with modulator 1525 would send 14 bits over the interface 1515. Each ABU 1510 performs respective beamforming in 4-channel (4-ch) DAC+beamformers 1530. For example, each ABU 1510 performs an independent beamforming such that the beamformed signals can combine over the air.

Figure 16:
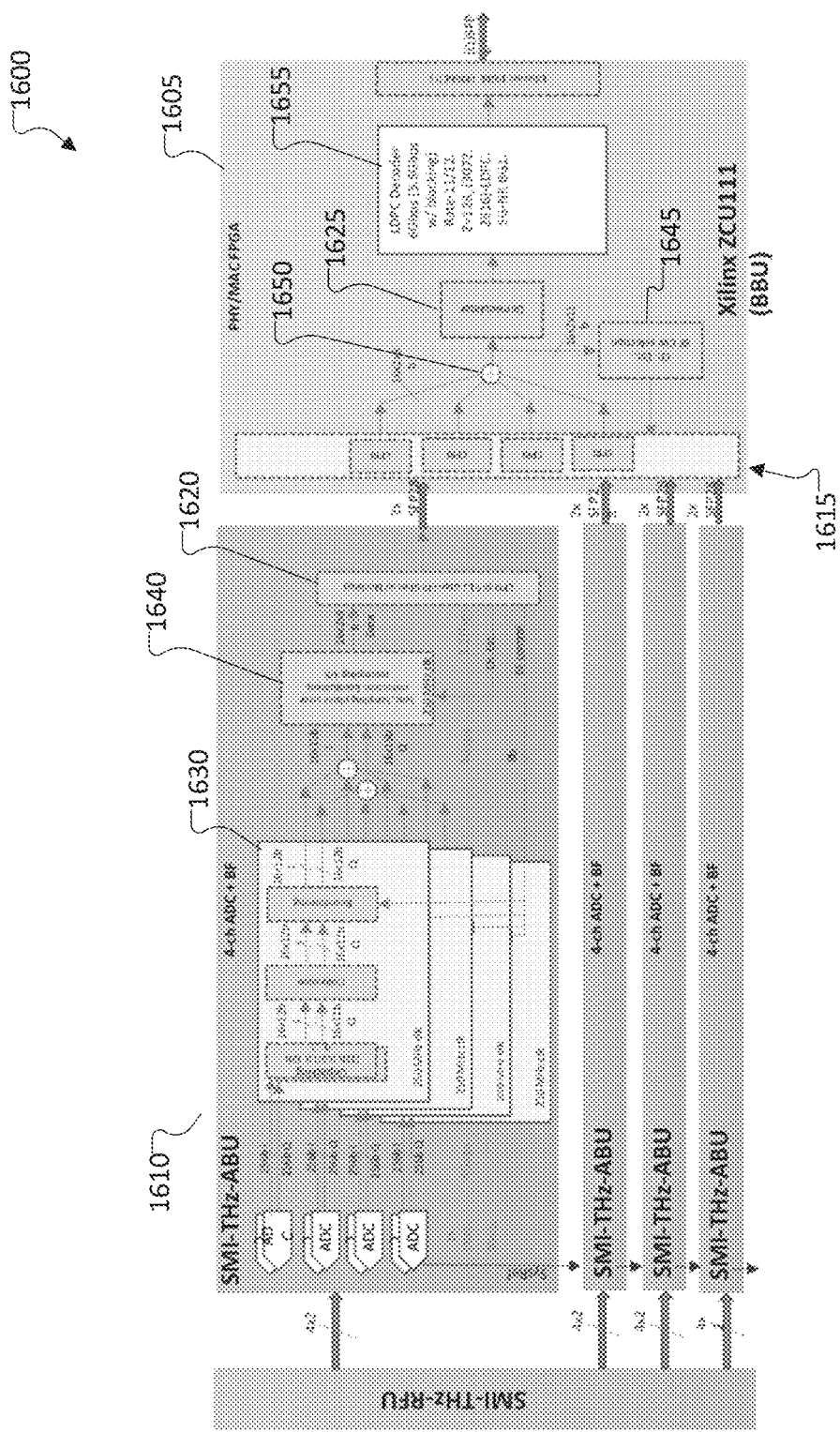
FIG. 16 illustrates another example high bandwidth transceiver architecture according to embodiments of the present disclosure.

FIG. 16 illustrates another example high bandwidth transceiver architecture according to embodiments of the present disclosure. The embodiment of the high bandwidth transceiver architecture 1600 shown in FIG. 16 is for illustration only. Other embodiments could be used without departing from the scope of the present disclosure. In the example shown in FIG. 16, a receiver side operation is illustrated. The receiver side transceiver can be the same as or similar to as transceivers 210 or 310. The receiver can include elements similar to those illustrated with respect to the high bandwidth transceiver architecture 1500 shown in FIG. 15. For example, the high bandwidth transceiver architecture 1600 includes a central processor unit (BBU) 1605 and multiple distributed processor units (ABU's) 1610. That is, the BBU 1605 comprises a processor, or processing circuitry, configured to operate as a central processor and each ABU 1610 comprises a processor, or processing circuitry, configured to operate as one of the distributed processors.

On the receiver side, the demodulator 1625 is included in the BBU 1605. The signal is received by each ABU 1610 and processed through 4-channel (4-ch) ADC+beamformers 1630. To reduce the number of bits on the I and Q inputs from 16 to 2 respectively, the data is processed through an equalizer 1640 in the ABU 1610. The equalizer 1640 regularizes the values because the symbols output from the equalizer 1640 are matched to a given constellation; therefore, by definition, providing for a least number of bits required for representing the original information. In the BBU 1605, channel estimation is performed and sent back to each of the ABU's 1610 to equalize the second and transmit via CPRI 1620 through to interface 1615 in the BBU 1605. In the BBU 1605, the respective equalized symbols from each of the ABU's 1610 is combined 1650 and processed through demodulation 1625 prior to decoding by LDPC decoder 1655. Because combination 1650 is linear, in certain embodiments, the equalization is before the combination and in certain embodiments, the equalization is after the combination.

Figure 17:
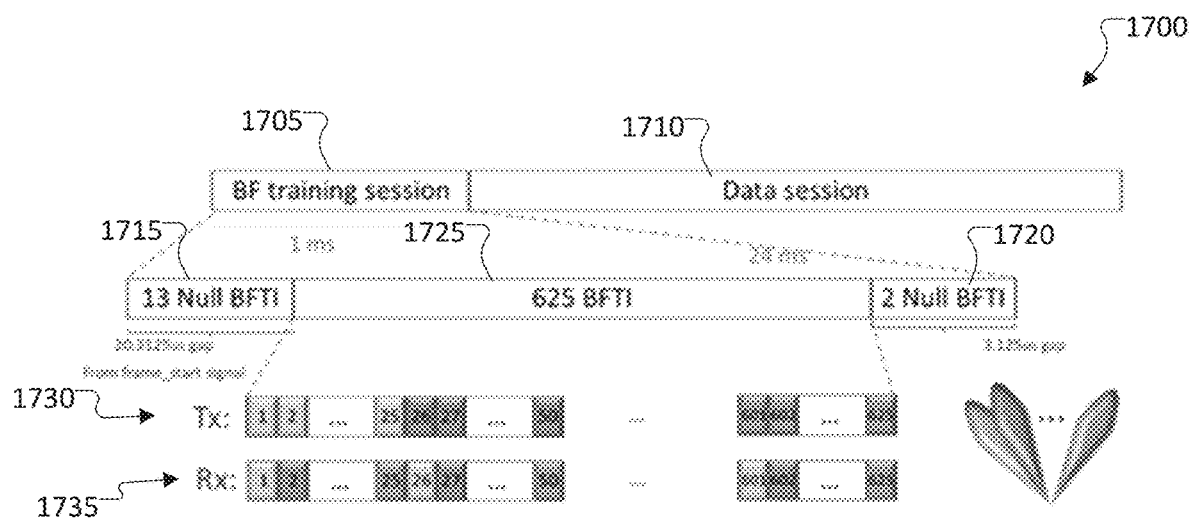
FIG. 17 illustrates an example single-carrier waveform's frame structure and beam cycling procedure during a beamforming training session according to embodiments of the present disclosure.
Figure 18:
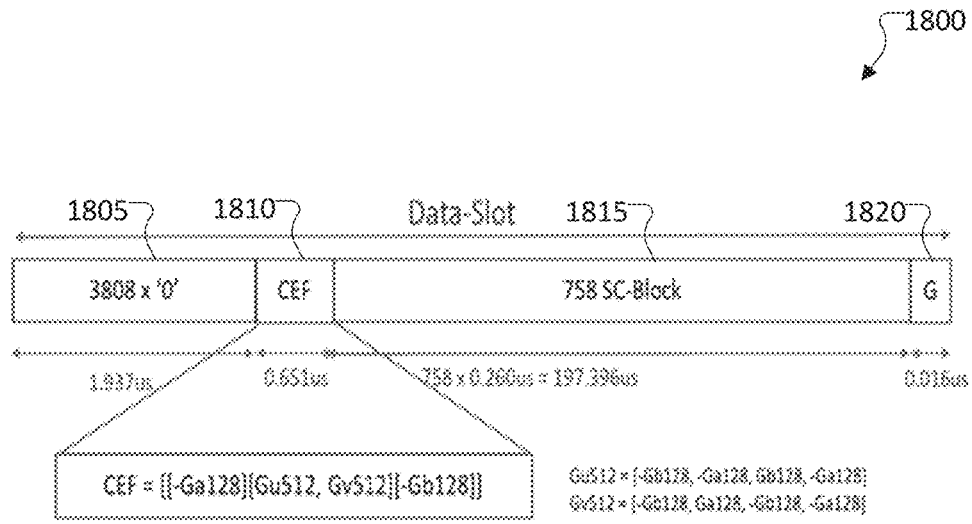
FIG. 18 illustrates an example data-Slot structure in the data session and channel estimation field (CEF) structure according to embodiments of the present disclosure.

FIG. 17 illustrates an example single-carrier waveform frame structure and beam cycling procedure during a beamforming training session according to embodiments of the present disclosure. The embodiment of the single-carrier waveform frame structure 1700 shown in FIG. 17 is for illustration only. Other embodiments could be used without departing from the scope of the present disclosure.

In certain embodiments, the baseband modem, such as modem 1415, implements a single-carrier waveform. Each frame 1700 is 25 ms in length and consists of a 1 ms beamforming training session 1705 and 24 ms data session 1710.

The beamforming training session 1710 includes 640 beamforming training intervals (BFTI). Out of the 640

BFTI, the first 13 BFTI 1715 and the last 2 BFTI 1720 were set to Null BFTI (i.e., send zeros). Effectively, 625 BFTI 1725 were actually used. The BFTI 1725 are used to test for all the combinations of 25 transmit-beams 1730 and 25 receive-beams 1735 every 25 ms using exhaustive search algorithm. In certain embodiments, the beamforming procedure is as follows: the transmitter sends 25 consecutive BFTIs on the same beam before switching to the next beam. On the receiver side, the Rx cycle its beam each BFTI, and it keeps track of the beam pairs, which maximizes the RSSI to be used in the data-session of the next frame.

FIG. 18 illustrates an example data-Slot structure in the data session and channel estimation field (CEF) structure according to embodiments of the present disclosure. The embodiment of the data-Slot structure 1800 shown in FIG. 18 is for illustration only. Other embodiments could be used without departing from the scope of the present disclosure.

The data session consists of 120 data-slots 1800. Each data-slot 1800 is 200 µs long to allow fast channel tracking and equalization. The data-slot 1800 starts with a null period 1805 of length 3808 zeros. This null period 1805 is used to estimate the noise on the channel, and has practical benefits in a prototyping system such as relaxing the timing constraints on the system. Next is the channel estimation field (CEF) 1810. The CEF 1810 is constructed using complimentary Golay sequences and has the same structure as in IEEE802.11a. The CEF 1810 has a zero-correlation zone of length 130 ns, which is estimated to be long enough to accommodate the delay spread of the channel. The CEF 1810 is followed by 758 single-carrier blocks (SC-Block) 1815. Each SC-Block 1815 is 512 Chips long, of them 480 are data symbols (data-block), and 32 are guard-pilot symbols (guard-block) 1820. The guard-block 1820 is used to facilitate frequency-domain equalization and to track phase-noise.

The waveform supports the following modulation and coding schemes (MCS): 1) QPSK with rate-1/2 LDPC code. 2) QPSK with rate-11/12 LDPC code. 3) 16-QAM with rate-11/12 LDPC code. The throughput achieved by these MCSs is 1.74, 3.19, and 6.39 Gbps, respectively, after accounting for all system overhead.

Figure 19:
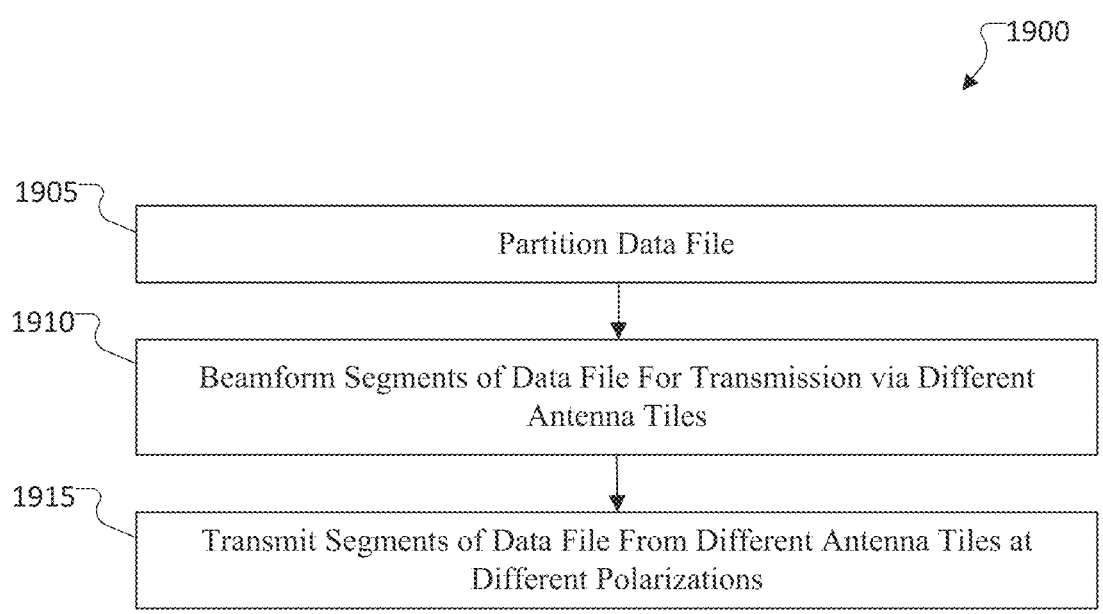
FIG. 19 illustrates a flow chart of a process for 140 GHz Digital Beamforming according to embodiments of the present disclosure.

FIG. 19 illustrates a flow chart of a process for 140 GHz Digital Beamforming according to embodiments of the present disclosure. While the flow chart depicts a series of sequential steps, unless explicitly stated, no inference should be drawn from that sequence regarding specific order of performance, performance of steps or portions thereof serially rather than concurrently or in an overlapping manner, or performance of the steps depicted exclusively without the occurrence of intervening or intermediate steps. The process depicted in the example depicted is implemented by a transmitter chain in, for example, a mobile station or base station.

The process 1900 for 140 GHz Digital Beamforming enables transmitting, by a transceiver via a base-tile antenna array comprising a plurality of antenna tiles, a data file over a number of channels. The process includes, in operation 1905, partitioning the data file into a number of data file segments. For example, a processor in the transmitter can encode and replicate data for transmission over multiple antenna panels. In operation 1910, the transmitter processing circuitry beamforms the encoded data replica, i.e., data segments, for transmission via different antenna panels. The transmitter, in operation 1915, transmits each of the data file segments via a different polarizations. For example, a first signal is transmitted via a first antenna tile at a first polarization and a second signal is transmitted via a second antenna tile at a second polarization. Each of the antenna tiles transmits a part of a bandwidth.

The above flowcharts illustrate example methods that can be implemented in accordance with the principles of the present disclosure and various changes could be made to the methods illustrated in the flowcharts herein. For example, while shown as a series of steps, various steps in each figure could overlap, occur in parallel, occur in a different order, or occur multiple times. In another example, steps may be omitted or replaced by other steps.

Although the present disclosure has been described with exemplary embodiments, various changes and modifications may be suggested to one skilled in the art. It is intended that the present disclosure encompass such changes and modifications as fall within the scope of the appended claims. None of the description in this application should be read as implying that any particular element, step, or function is an essential element that must be included in the claims scope. The scope of patented subject matter is defined by the claims.

What is claimed is:

1. An apparatus comprising:
   a transceiver configured to communicate via a wired or wireless communication medium;
   a processor; and
   a base-tile antenna array comprising a plurality of antenna tiles; wherein each of the antenna tiles comprises:
   a radio frequency integrated circuit (RFIC); and
   an antenna-array-in-package comprising a plurality of antenna elements,
   wherein the antenna tiles are disposed at different rotations such that a first antenna tile is disposed to transmit a first signal at a first polarization and a second antenna tile is disposed to transmit a second signal at a second polarization, and
   wherein each of the antenna tiles transmits a part of a bandwidth.

2. The apparatus of claim 1, wherein the antenna-array-in-package comprises a n×j antenna array having n×j antenna elements,
   wherein the base-tile antenna array comprises a m×k antenna array having m×k antenna tiles, and
   wherein each of the n, the j, the m, and the k are integer values.

3. The apparatus of claim 1, wherein the base-tile antenna array comprises a 45° polarized antenna, and
   wherein at least one of the first signal or the second signal is feed to the base-tile antenna array from at least two sides.

4. The apparatus of claim 1, wherein the transceiver comprises:
   a central processor; and
   multiple distributed processors configured to jointly form a beam,
   wherein a partitioning of transceiver modules is unsymmetrical in a transmitter direction and a receiver direction.

5. The apparatus of claim 4, wherein, in the transmitter direction, multiple encoded bits replica are sent to the distributed processors, and modulation is performed by the distributed processors, and
   wherein, in the receiver direction, equalized symbols are sent to the central processor, and demodulation is performed in the central processor.

6. The apparatus of claim 1, wherein the processor is configured to transmit at least one of the first signal and the second signal, via the transceiver and the base-tile antenna array, using a periodic frame structure, wherein each period includes a beamforming-training-session and data-session.

7. The apparatus of claim 6, wherein each beamforming-training-session includes a preset number of beamforming-training-intervals, and each data-session includes a pre-determined number of data slots.

8. A method comprising:
transmitting, by a transceiver via a base-tile antenna array comprising a plurality of antenna tiles, a data file over a number of channels, by:
partitioning the data file into a number of data file segments; and
transmitting each of the data file segments via different rotations such that a first signal is transmitted via a first antenna tile at a first polarization and a second signal is transmitted via a second antenna tile at a second polarization,
wherein each of the antenna tiles transmits a part of a bandwidth, and
wherein each of the antenna tiles comprises:
a radio frequency integrated circuit (RFIC); and
an antenna-array-in-package comprising a plurality of antenna elements.

9. The method of claim 8, wherein the antenna-array-in-package comprises a n×j antenna array having n×j antenna elements,
wherein the base-tile antenna array comprises a m×k antenna array having m×k antenna tiles, and
wherein each of the n, the j, the m, and the k are integer values.

10. The method of claim 8, wherein the base-tile antenna array comprises a 45° polarized antenna, and
wherein at least one of the first signal or the second signal is feed to the base-tile antenna array from at least two sides.

11. The method of claim 8, wherein the transceiver comprises:
a central processor; and
multiple distributed processors configured to jointly form a beam,
wherein a partitioning of transceiver modules is unsymmetrical in a transmitter direction and a receiver direction.

12. The method of claim 11, further comprising:
in the transmitter direction, sending multiple encoded bits replica to the distributed processors, and modulating, by the distributed processors, the encoded bits replica; and
in the receiver direction, sending equalized symbols to the central processor, and demodulating the equalized symbols by the central processor.

13. The method of claim 8, wherein transmitting comprises transmitting at least one of the first signal and the second signal, via the transceiver and the base-tile antenna array, using a periodic frame structure, wherein each period includes a beamforming-training-session and data-session.

14. The method of claim 13, wherein each beamforming-training-session includes a preset number of beamforming-training-intervals, and each data-session includes a pre-determined number of data slots.

15. A non-transitory computer readable medium comprising a plurality of instructions that, when executed by at least one processor, cause the at least one processor to:
transmit, via a transceiver coupled to a base-tile antenna array comprising a plurality of antenna tiles, a data file over a number of channels, by:
partitioning the data file into a number of data file segments; and
transmitting each of the data file segments via different rotations such that a first signal is transmitted via a first antenna tile at a first polarization and a second signal is transmitted via a second antenna tile at a second polarization,
wherein each of the antenna tiles transmits a part of a bandwidth, and
wherein each of the antenna tiles comprises:
a radio frequency integrated circuit (RFIC); and
an antenna-array-in-package comprising a plurality of antenna elements.

16. The non-transitory computer readable medium of claim 15, wherein the antenna-array-in-package comprises a n×j antenna array having n×j antenna elements,
wherein the base-tile antenna array comprises a m×k antenna array having m×k antenna tiles, and
wherein each of the n, the j, the m, and the k are integer values.

17. The non-transitory computer readable medium of claim 15, wherein the base-tile antenna array comprises a 45° polarized antenna, and
wherein at least one of the first signal or the second signal is feed to the base-tile antenna array from at least two sides.

18. The non-transitory computer readable medium of claim 15, wherein the transceiver comprises:
a central processor; and
multiple distributed processors configured to jointly form a beam,
wherein a partitioning of transceiver modules is unsymmetrical in a transmitter direction and a receiver direction.

19. The non-transitory computer readable medium of claim 18, wherein the plurality of instructions is further configured to cause the at least one processor to:
in the transmitter direction, send multiple encoded bits replica to the distributed processors, and modulating, by the distributed processors, the encoded bits replica; and
in the receiver direction, send equalized symbols to the central processor, and demodulating the equalized symbols by the central processor.

20. The non-transitory computer readable medium of claim 15, wherein the plurality of instructions is further configured to cause the at least one processor to transmit at least one of the first signal and the second signal, via the transceiver and the base-tile antenna array, using a periodic frame structure, wherein each period includes a beamforming-training-session and data-session, and
wherein each beamforming-training-session includes a preset number of beamforming-training-intervals, and each data-session includes a pre-determined number of data slots.

* * * * *